`US006820895B2`

(12) United States Patent
Levine

(10) Patent No.: US 6,820,895 B2
(45) Date of Patent: Nov. 23, 2004

(54) VEHICLE AIR BAG MINIMUM DISTANCE ENFORCEMENT APPARATUS, METHOD AND SYSTEM

(75) Inventor: Richard Levine, Chappaqua, NY (US)

(73) Assignee: Vehicle Safety Systems, Inc., Elmsford, NY (US)

( * ) Notice: Subject to any disclaimer, the term of this patent is extended or adjusted under 35 U.S.C. 154(b) by 15 days.

(21) Appl. No.: 10/098,327

(22) Filed: Mar. 14, 2002

(65) Prior Publication Data

US 2002/0158453 A1 Oct. 31, 2002

Related U.S. Application Data

(63) Continuation-in-part of application No. 09/897,536, filed on Jul. 2, 2001, now Pat. No. 6,634,669, which is a continuation of application No. 09/220,832, filed on Dec. 24, 1998, now Pat. No. 6,293,584.
(60) Provisional application No. 60/101,487, filed on Sep. 23, 1998, provisional application No. 60/105,245, filed on Oct. 22, 1998, and provisional application No. 60/105,595, filed on Oct. 26, 1998.

(51) Int. Cl.$^7$ .......................... B60N 2/06; B60R 21/00; G05G 1/14
(52) U.S. Cl. ........................ 280/735; 296/68.1; 701/49; 74/512
(58) Field of Search ........................... 280/735; 701/49, 701/45; 296/68.1; 74/512, 513, 514

(56) References Cited

U.S. PATENT DOCUMENTS

| | | | |
|---|---|---|---|
| 3,691,868 A | 9/1972 | Smith | |
| 3,975,972 A | 8/1976 | Muhleck | |

(List continued on next page.)

FOREIGN PATENT DOCUMENTS

| | | | |
|---|---|---|---|
| DE | 26 44 626 A1 | 4/1977 | |
| DE | 29 41 345 A10 | 4/1981 | |

(List continued on next page.)

OTHER PUBLICATIONS

B. Chapin, "Demand Stretches Supplier. Adjustable Pedals Are Hot Sellers", Automotive News, Jul. 15, 1999, 1 page.

PCT Search Report for PCT/US99/21794, mailed on Apr. 11, 2000.

Primary Examiner—Peter C. English
(74) Attorney, Agent, or Firm—Kenyon & Kenyon

(57) ABSTRACT

A vehicle air-bag apparatus for use with a first air-bag and a first seat mounted within a passenger compartment of a vehicle, the apparatus including a first seat position adjusting mechanism to movably connect the first seat with respect to the vehicle, and to allow the first seat to move relative to the first air-bag along a first axis between a forward-most position and a rearward-most position, in which the forward-most position is a position of the first seat in which a distance between a passenger seated in the first seat and the first air-bag is equal to a minimum clearance distance, displacement of the first seat away from the forward-most position increasing the distance between the first seat and the first air-bag, and the first air-bag is fixedly positioned with respect to one of a steering wheel assembly for a driver and a dashboard arrangement for a passenger other than the driver, in which the minimum clearance distance is the distance between a reference line of a seat-back of the first seat less a predetermined protrusion of an occupant. The predetermined protrusion of the occupant is one of a fixed distance, and an actual occupant protrusion. The actual occupant protrusion is determinable based on an extracted seat belt length.

59 Claims, 19 Drawing Sheets

U.S. PATENT DOCUMENTS

| | | | |
|---|---|---|---|
| 4,870,871 A | | 10/1989 | Ivan |
| 5,071,160 A | | 12/1991 | White et al. |
| 5,074,583 A | * 12/1991 | | Fujita et al. ............. 280/730.1 |
| 5,330,226 A | * 7/1994 | | Gentry et al. ............... 280/735 |
| 5,413,378 A | * 5/1995 | | Steffens et al. ............ 280/735 |
| 5,446,661 A | | 8/1995 | Gioutsos et al. |
| 5,461,939 A | | 10/1995 | Upton |
| 5,466,001 A | * 11/1995 | | Gotomyo et al. ........... 280/735 |
| 5,490,069 A | | 2/1996 | Gioutsos et al. |
| 5,531,472 A | | 7/1996 | Semchena et al. |
| 5,626,359 A | | 5/1997 | Steffens, Jr. et al. |
| 5,653,462 A | | 8/1997 | Breed et al. |
| 5,678,854 A | | 10/1997 | Meister et al. |
| 5,683,103 A | | 11/1997 | Blackburn et al. |
| 5,702,123 A | | 12/1997 | Takahashi et al. |
| 5,722,302 A | * 3/1998 | | Rixon et al. .................. 74/512 |
| 5,771,752 A | | 6/1998 | Cicotte |
| 5,803,491 A | | 9/1998 | Barnes et al. |
| 5,819,593 A | | 10/1998 | Rixon et al. |
| 5,822,707 A | * 10/1998 | | Breed et al. ................... 701/49 |
| 5,839,326 A | | 11/1998 | Song |

FOREIGN PATENT DOCUMENTS

| | | | | |
|---|---|---|---|---|
| DE | 40 23 109 A1 | 1/1992 | | |
| DE | 44 00 934 C1 | 1/1994 | | |
| DE | 43 41 500 A1 | 6/1994 | | |
| DE | 44 06 897 C1 | 5/1995 | | |
| DE | 196 54 705 A1 | 7/1997 | | |
| DE | 196 37 108 A1 | 3/1998 | | |
| JP | 48-7414 | 1/1973 | | |
| JP | 50-6694 | 3/1975 | | |
| JP | 51-22218 | 2/1976 | | |
| JP | 52-44923 | 4/1977 | | |
| JP | 57-182531 | 11/1982 | | |
| JP | 61-94829 | 5/1986 | | |
| JP | 62-5700 | 2/1987 | | |
| JP | 62-25768 | 7/1987 | | |
| JP | 63-34254 | 2/1988 | | |
| JP | 63-49528 | 3/1988 | | |
| JP | 2-39214 | 2/1990 | | |
| JP | 2-129710 | 5/1990 | | |
| JP | 4-138939 | 5/1992 | | |
| JP | 6-63262 | 8/1994 | | |
| JP | 7-96785 | 4/1995 | | |
| JP | 7-96786 | 4/1995 | | |
| JP | 7-96787 | 4/1995 | | |
| JP | 07096784 A | * 4/1995 | ............ | B60N/2/06 |
| JP | 7-125614 | 5/1995 | | |
| JP | 7-125616 | 5/1995 | | |
| JP | 7-164934 | 6/1995 | | |
| JP | 7-164935 | 6/1995 | | |
| JP | 7-191773 | 7/1995 | | |
| JP | 7-191774 | 7/1995 | | |
| JP | 7-223519 | 8/1995 | | |
| JP | 7-271464 | 10/1995 | | |
| JP | 7-334261 | 12/1995 | | |
| JP | 7-334262 | 12/1995 | | |
| JP | 8-22338 | 1/1996 | | |
| JP | 8-30346 | 2/1996 | | |
| JP | 9-301010 | 11/1997 | | |

* cited by examiner

VEHICLE AIR BAG MINIMUM DISTANCE ENFORCEMENT APPARATUS, METHOD AND SYSTEM

RELATED APPLICATION INFORMATION

This application is a continuation-in-part application of U.S. patent application Ser. No. 09/897,536, filed Jul. 2, 2001, U.S. Pat. No. 6,634,669, which is a continuation of U.S. patent application Ser. No. 09/220,832, filed Dec. 24, 1998, U.S. Pat. No. 6,293,584, which claims the benefit and priority of: U.S. Provisional Application No. 60/101,487, filed Sep. 23, 1998; U.S. Provisional Application No. 60/105,245, filed Oct. 22, 1998; and U.S. Provisional Application No. 60/105,595, filed Oct. 26, 1998.

FIELD OF THE INVENTION

The present invention relates to safety systems and methods for vehicles, and, in particular, to vehicle air-bag systems, that take into account a clearance between a vehicle passenger and an air-bag.

BACKGROUND INFORMATION

Although statistics may indicate that vehicles equipped with air-bags have enhanced passenger safety, under certain conditions air-bags may have been identified as a source of passenger injuries and may have even been cited in some cases as causing death. As understood, deaths may have been attributed to air-bags predominantly in low-speed accidents, and air-bags may have also been a factor in deaths resulting from high-speed accidents.

Some of these injuries may have involved shorter drivers (especially, for example, drivers about 5'0" or less in height) who adjust the seat position so that a distance between the air-bag and the driver are reduced below a safe clearance. Drivers taller than about 5'0" may also position themselves within the minimum safe clearance, and this positioning may be dangerous regardless of the height of the driver. In certain systems, as all of the adjustment for drivers of various sizes may be done through seat movement, shorter drivers may be positioned closer to the steering wheel (and the air-bag contained therein) than are taller drivers. As indicated above, this may result in shorter drivers (such as, for example, those about 5'0" or less in height), along with taller drivers who chose to sit close to the steering wheel, being positioned within a predetermined safe clearance. Depending on the air-bag system used, the safe clearance may vary. It is believed that a clearance of about 10" between the driver and the air-bag should generally be sufficient to eliminate at least certain ones of any negative effects of air-bag systems.

Vehicle seats may allow adjustment of the driver's seat between a rearward-most position and a forward-most position separated by a distance sufficient to accommodate the range of leg lengths in the adult population, such as, for example, approximately 8". It is believed that these systems may address differences in leg length, as differences in arm and torso length among the population may be less substantial.

Thus, to operate the pedals in prior systems, shorter adults were forced to move the seat forward, often to the forward-most position while a portion of taller adults also chose to move the seat beyond the safe clearance. This causes a corresponding distance closure between the drivers chest and head and the steering wheel in which the air-bag is often located. Thus, when the seat is in the forward-most position, a driver will be separated from the steering wheel by a distance less than the required minimum safe clearance. This problem may have been addressed by systems that determine when the driver is positioned closer than the minimum safe clearance and then adjust or suspend air-bag operation. In addition to disabling air-bags when the clearance is unsafe, prior systems have slowed the rate of air-bag inflation or inflated the air-bag in stages. These systems, however, may deprive shorter drivers of the full effectiveness of the air-bag system.

Other areas of concern are in the appropriate use of reduced inflation bags and in post-crash escape and rescue actions. Seat belts, automatic door locks and electric windows may become liabilities following severe impact, rollover, or in submerged vehicle situations.

It is believed, however, that insufficient attention may have been given to computerized safety automation and post-crash escape as they relate to these features. Rather, industry efforts have been directed to manual devices such as the "Pointed Window Breaking Hammer" now offered as a car safety accessory to expedite escape.

SUMMARY OF THE INVENTION

An exemplary embodiment and/or exemplary method of the present invention is directed to a vehicle safety device including a seat mounted within a passenger compartment of the vehicle, in which the seat is movably connected to a vehicle frame by a seat position adjusting mechanism which allows the seat to move along an axis between a forward-most position and a rearward-most position. An air-bag is mounted within the passenger compartment in front of the forward-most position of the seat, with the forward-most position of the seat defined as a position of the seat in which a distance between a passenger seated in the seat and the air-bag is equal to a minimum safe clearance.

An exemplary embodiment and/or exemplary method of the present invention is also directed to a method of maintaining a minimum safe clearance between an air-bag mounted in a vehicle and a vehicle passenger including the steps of preventing motion of a seat toward the air-bag beyond a forward-most position wherein, when in the forward-most position, a passenger seated in the seat is separated from the air-bag by a predetermined minimum safe clearance and providing a position adjusting mechanism for at least one vehicle control pedal to allow a passenger seated in the seat to adjust a distance between the seat and the at least one pedal by moving the at least one pedal toward and away from the seat.

An exemplary embodiment and/or exemplary method of the present invention is also directed to a vehicle safety device including a seat mounted within a passenger compartment of the vehicle, in which the seat is movably connected to a vehicle frame by a seat position adjusting mechanism that allows the seat to move along an axis between a forward-most position and a rearward-most position. An air-bag is mounted within the passenger compartment in front of the forward-most position of the seat, with the forward-most position of the seat defined as a position of the seat in which a distance between a passenger seated in the seat and the air-bag is equal to a minimum safe clearance. In addition, an exemplary method of maintaining a minimum safe clearance between an air-bag mounted in a vehicle and a vehicle passenger includes the steps of preventing motion of a seat toward the air-bag beyond a forward-most position, in which, when in the forward-most position, a passenger seated in the seat is separated from the air-bag by a predetermined minimum safe clearance, and providing a position adjusting mechanism for at least one vehicle control pedal to allow a passenger seated in the seat to adjust a distance between the seat and the at least one pedal by moving the at least one pedal toward and away from the seat. An automatic seat positioning system (which takes into account both seat to air-bag distance and ;eye height and automatically) may be used to optimally position a passenger to maximize safety and comfort.

DETAILED DESCRIPTION

Figure 1A:
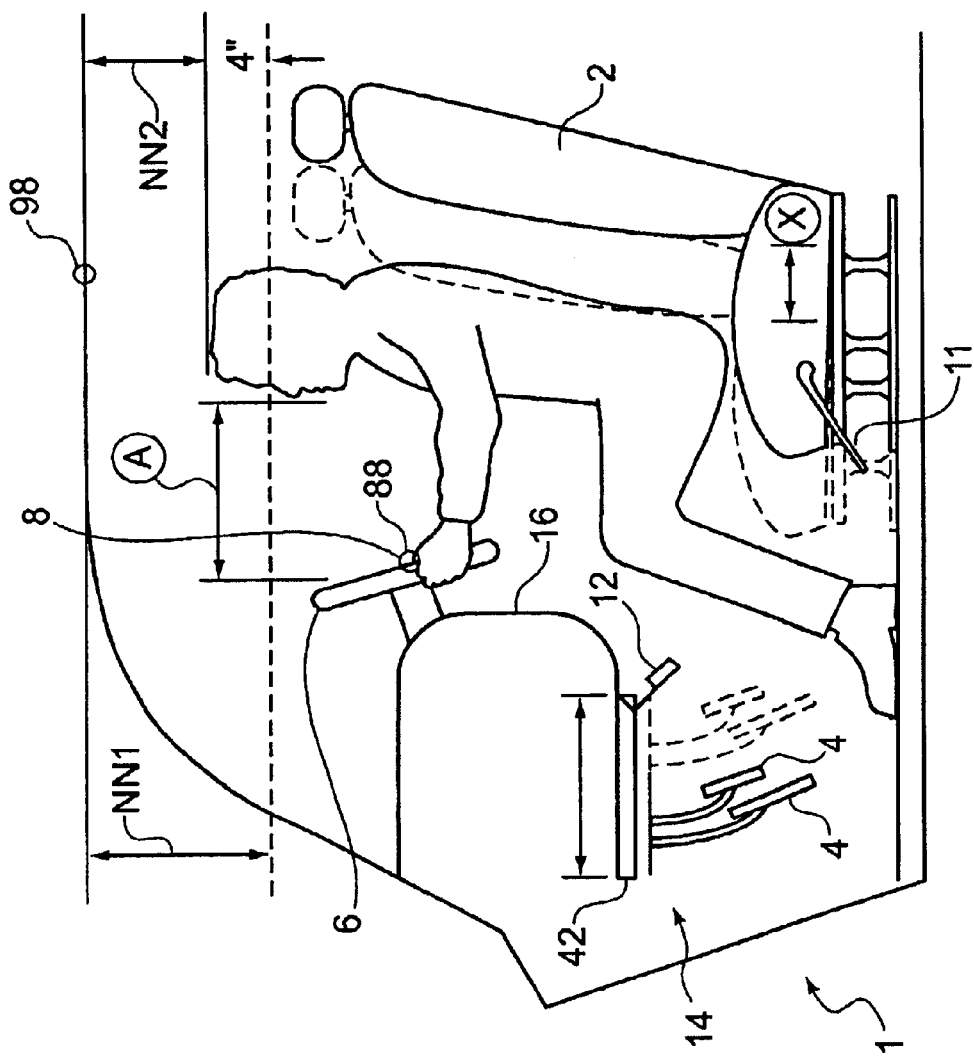
FIG. 1A shows a driver side view of a passenger compartment of a vehicle equipped with a vehicle safety system according to a first exemplary embodiment of the present invention.

FIG. 1A shows a system according to an exemplary embodiment of the present invention in which a driver positioned on a seat 2 adjusts the position of the seat 2 to a desired position between rearward and forward-most positions separated by a distance X. Then, the driver adjusts the position of the pedals 4 so that, when in the desired seat position, the driver can comfortably reach the pedals 4 (accelerator, brake, clutch, etc.). Any suitably appropriate manual or automatic seat positioning mechanism may be employed in a vehicle safety device according to the exemplary embodiment and/or exemplary method of the present invention. For example, a seat position adjusting mechanism may include a lever 11 which, in a first position, prevents the seat 2 from moving forward and rearward and which, in a second position, releases the seat 2 so that the seat 2 may be moved forward and rearward by a passenger seated in the seat 2.

A vehicle safety system according to the exemplary embodiment of the present invention limits the motion of the seat 2 toward the steering wheel 6 or other point of deployment of an air-bag 8 so that a distance A between the driver and the air-bag 8 is at least a minimum safe clearance. Thereafter, the remainder of any further reduction of the distance between the driver and the pedals 4 is achieved by a rearward adjustment of the position of the foot pedals 4.

By providing limited adjustment of the position of the seat 2, drivers may still adjust for the relatively smaller variations in chest depth and arm length while the adjustment of the position of the pedals 4 allows for the larger adjustments necessary to accommodate differences in leg length.

The minimum safe clearance may be maintained by limiting seat-back motion toward the steering wheel 6 center to a distance equal to the minimum safe clearance plus a value for a minimum adult chest depth (such as, for example, approximately 8"). Thus, for a 10" minimum safe clearance and using 8" for the minimum adult chest depth, the seat 2 would be prevented from moving forward past a point where the seat-back is 18" from the steering wheel 6. In such a system, as pedal position adjustment allows for the greater difference in leg length, a distance between the forward-most and rearward-most positions of the seat, allowing only for the lesser differences between chest depth and arm length, could be reduced to approximately 2½". Then, providing 6" of adjustment between forward-most and rearward-most positions of the foot pedals 4 makes available to the driver of such a vehicle an amount of total adjustment of the distance between the driver and the pedals 4 comparable to that provided in previous systems. Although distances between the driver and the steering wheel 6 are being discussed as examples, the only distance that matters is that between an occupant of the vehicle (driver or passenger) and the air-bag cover, which is a distance A from the steering wheel located air-bag for the driver of FIG. 1A and which is a distance A' from the dashboard located air-bag for the passenger of FIG. 1B.

Figure 1B:
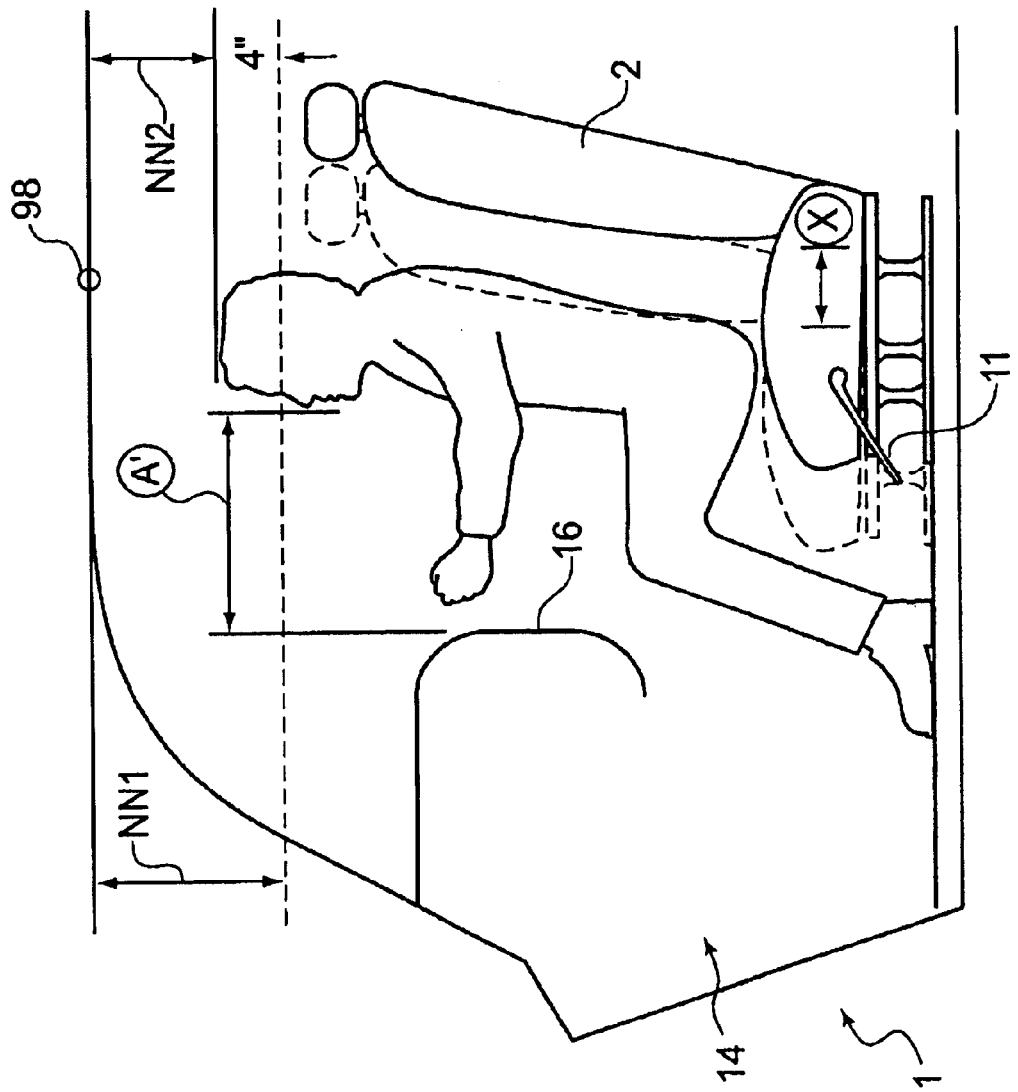
FIG. 1B shows a passenger side view of a passenger compartment of a vehicle equipped with a vehicle safety system according to a first exemplary embodiment of the present invention.
Figure 2:
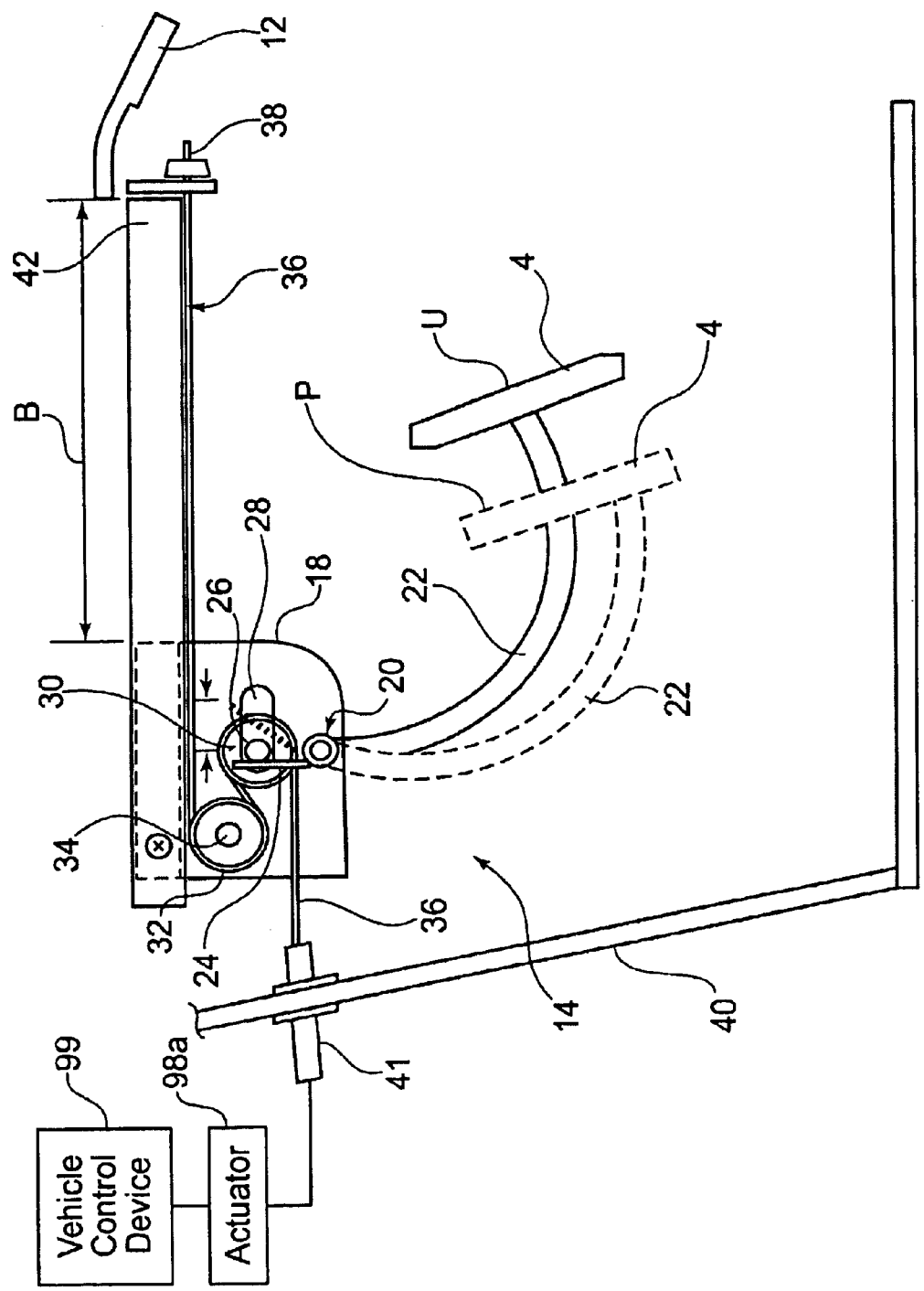
FIG. 2 shows a partially cross-sectional side view of a first pedal position adjustment apparatus for use with the first embodiment of the invention.

FIG. 2 shows a manual system for pedal position adjustment which operates similarly to the mechanisms in use for manual adjustment of seat position. When a lever 12 is moved into a release position, a pedal slide mechanism 14 coupled between the frame of the vehicle 1 and the pedals 4 is released into an unlocked configuration in which a pedal slide housing 18 and, consequently, the pedals 4 may be slid forward and rearward relative to the vehicle dashboard 16 (FIG. 1) to a desired position. When the lever 12 is moved from the release position to a locked position, the pedal slide housing 18 is locked into the desired position. Of course, the lever 12 may be biased toward the locked position, such as, for example, by a spring, so that the lever 12 automatically returns to the locked position when released. If desired, individual pedals 4 may be mounted to separate pedal slide mechanisms 14 thereby allowing each pedal 4 to be adjusted to an optimum position. Alternatively, the pedals 4 may be coupled together for motion forward and rearward in unison so that a predetermined relative positioning of the pedals 4 is maintained.

The pedal 4 of FIG. 2 is pivotally coupled to a slide housing 18 for rotation about an axle 20 with an upper extension 24 of the pedal bar 22. The upper extension 24 abuts a first pin 26 which is slidably received in a channel 28 formed in the slide housing 18 and a first pulley 30 is pivotally mounted on the first pin 26. A second pulley 32 is pivotally mounted on a second pin 34 which is fixedly coupled to the slide housing 18 and a cable 36 extends from an anchor 38, around the first and second pulleys 30, 32, through a firewall 40 via a conduit 41 to an actuator 98a which operates a vehicle control device 99, such as, for example, clutch, brake or accelerator.

The letter P in FIG. 2 indicates the position of the pedal 4 in a pressed position while the letter U indicates the position of the pedal 4 in an unpressed position. When in the unpressed position U, the upper extension 24 extends substantially vertically so that the first pin 26 and the first pulley 30 are positioned at the front of the channel 28 as the pedal 4 is biased into the unpressed position U by, for example, a spring or other known mechanism. In the unpressed position U with the first pulley 30 at the front of the channel 28, a portion of the cable 36 extending between the anchor 38 and the first pulley 30 is at a minimum length thereby operating the actuator into a configuration corresponding to the unpressed condition of the pedal 4. When the pedal 4 is depressed to the pressed position P, the upper extension 24 rotates (clockwise as seen in FIG. 2) to the position indicated by the dashed line pushing the first pin 26 and the first pulley 30 rearward in the channel 28 and increasing the length of the portion of the cable 36 which extends between the first pulley 30 and the anchor 38. This draws the actuator into a configuration corresponding to the pressed position P of the pedal 4.

The slide housing 18 is slidably mounted to a channel member 42 which is rigidly coupled to a lower surface of the dashboard 16 or bracketed to the firewall 40 for motion between forward-most and rearward-most pedal positions separated by a distance B. Regardless of the position of the slide housing 18 along the channel member 42, the total cable length from the firewall 40 to anchor 38 remains constant and, therefore, the action of the cable 36 on the actuator will be unchanged by an adjustment of the position of the slide housing 18. Thus, the position of the pedal 4 may be adjusted forward and rearward without affecting the operation of the actuator or the corresponding vehicle control device.

Figure 3:
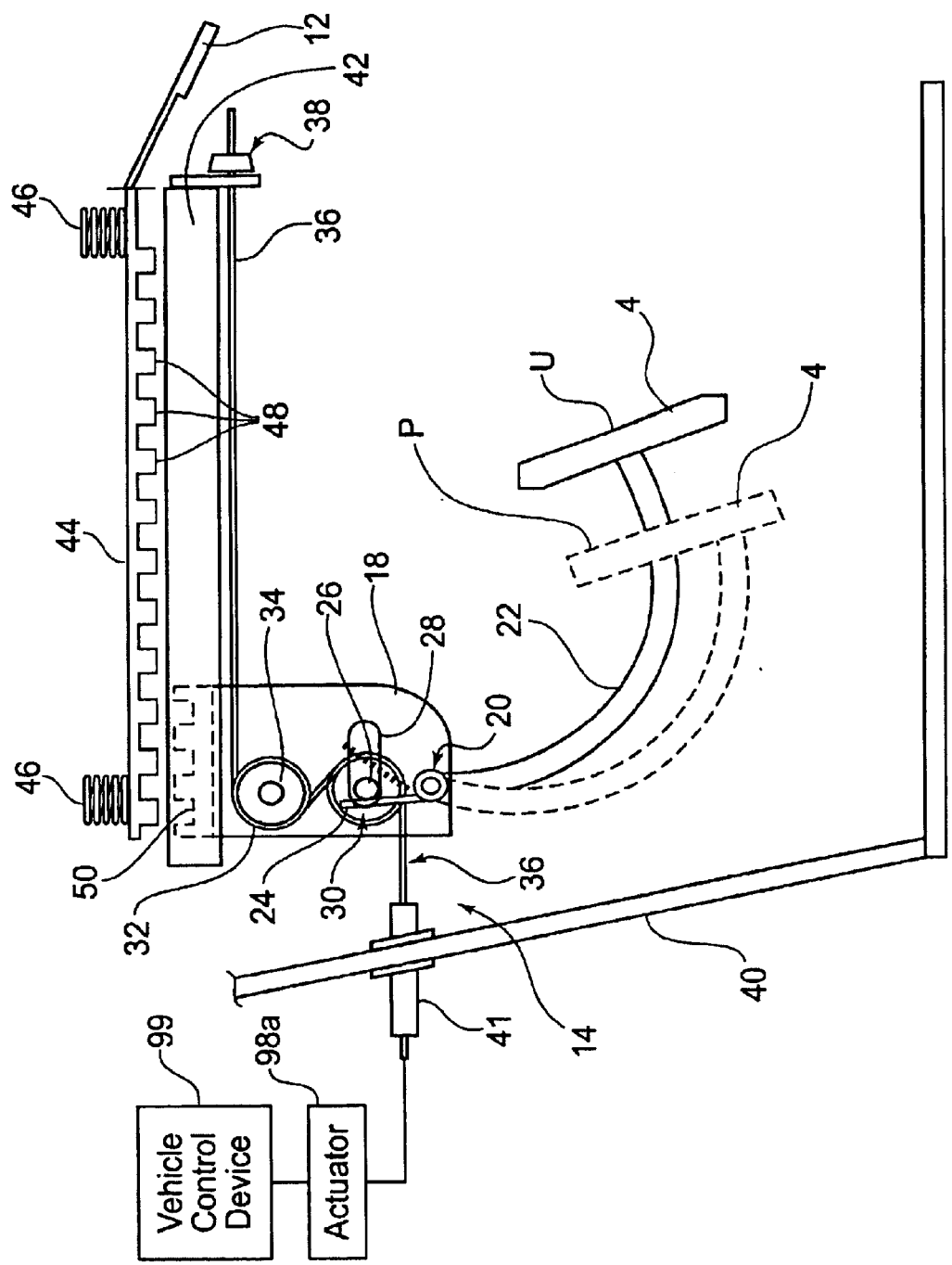
FIG. 3 shows a partially cross-sectional side view of a second pedal position adjustment apparatus for use with the first embodiment of the invention.

FIG. 3 shows an adjustable pedal position mechanism substantially similar to that of FIG. 2 except that the slide housing 18 extends further vertically with the first pulley 30 arranged below the second pulley 32 as opposed to the lateral arrangement depicted in FIG. 2 and, in addition, FIG. 3 shows a mechanism for locking the pedal slide mechanism 14 in a desired position. In addition, FIG. 3 shows an exemplary mechanism for locking the slide housing 18 and, consequently, the pedal 4 in a desired position along the channel member 42. The locking mechanism includes a ridged plate 44 biased toward an upper surface of the slide housing 18 by springs 46. The ridged plate 44 includes a plurality of projections 48 sized to be received in recesses 50 formed in an upper surface of the slide housing 18. The ridged plate 44 is coupled to the lever 12 so that, when the lever 12 is pulled upward, the ridged plate 44 is disengaged from the slide housing 18 and the slide housing 18 may be freely slid forwardly and rearwardly along the channel 42. Then, when the lever 12 is released after adjusting the pedal 4 to the desired position, springs 46 move the ridged plate 44 down into engagement with the recesses 50 of the slide housing 18 to maintain the slide housing 18 in the desired position. The above-described locking mechanism is exemplary only and that any number of known mechanisms may be used to lock the channel in the desired position.

Figure 4A:
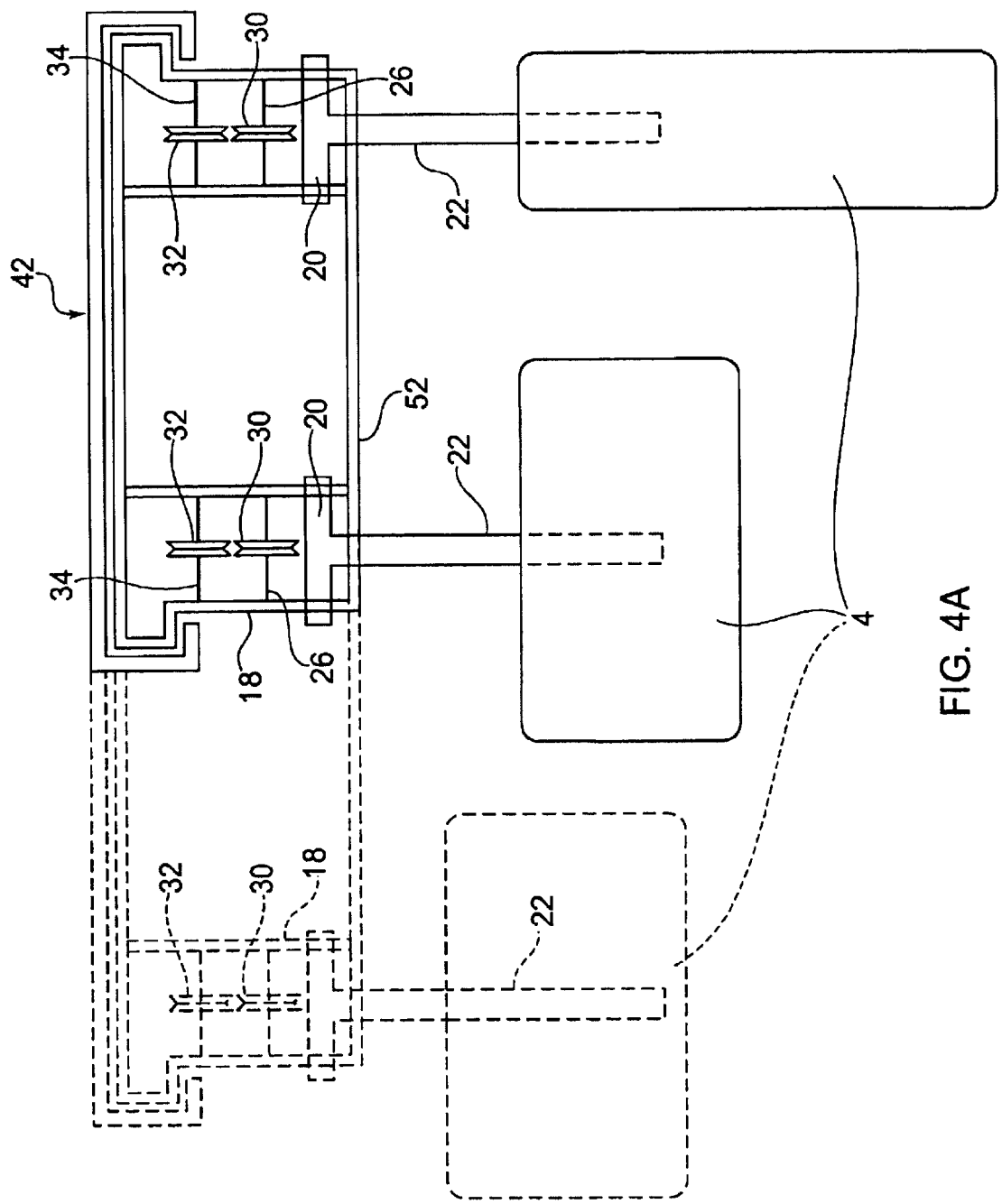
FIG. 4A shows a partially cross-sectional front view of the pedal position adjustment apparatus of FIG. 3.
Figure 4B:
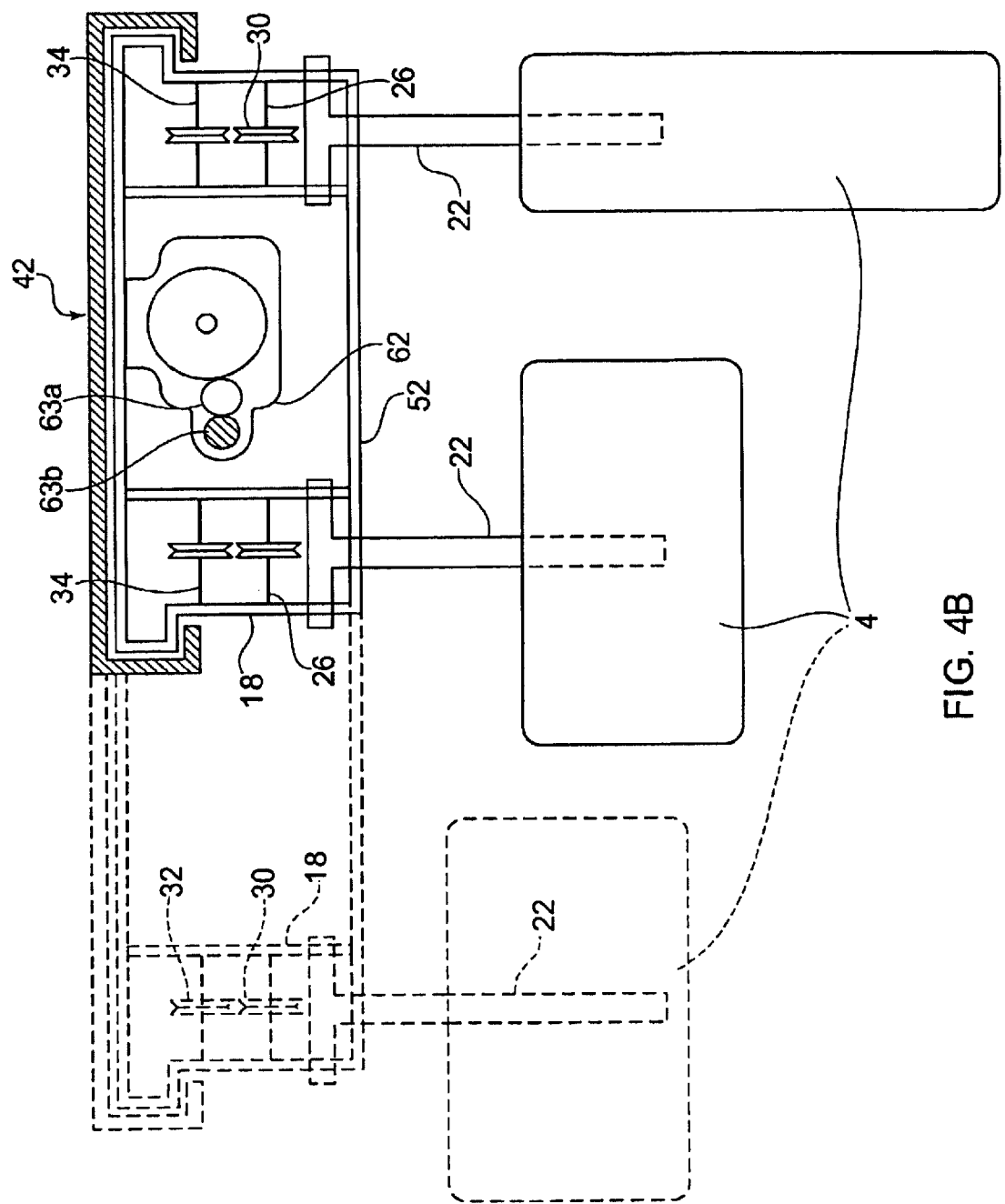
FIG. 4B shows a partially cross-sectional front view of the pedal position adjustment apparatus of FIG. 3, including the motor and worm gear arrangement.

FIG. 4A shows a partially cross-sectional front view of the adjustable pedal position mechanism of FIG. 3 showing two pedals 4 mounted to slide housings 18 which are rigidly coupled to one another via a connecting member 52 so that the position of both pedals 4 relative to one another is maintained constant as the adjustable pedal position mechanism is operated to achieve a desired pedal position. As indicated by the !third pedal 4 shown in dotted lines in FIG. 4A, any number of pedals may be interlinked for common forward and rearward motion with this mechanism. In the alternative, additional pedals may be de-linked from the first two pedals to allow independent positioning thereof. In addition, one or more slide housings 18 may be formed as a single one-piece unit together with the corresponding connecting members 52 so that the unit as a whole moves along the channel 42.

Figure 5:
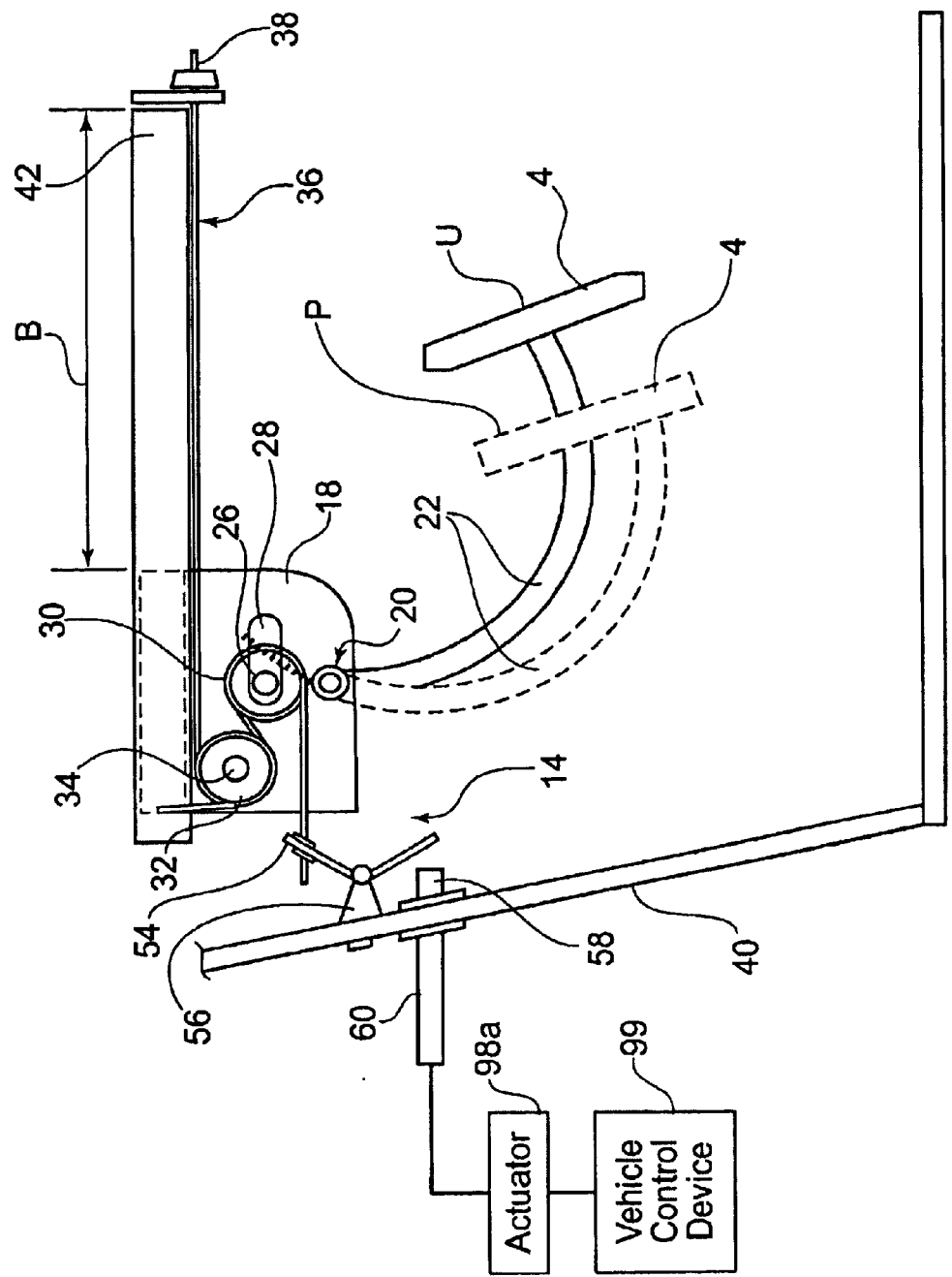
FIG. 5 shows a partially cross-sectional side view of a third pedal position adjustment apparatus for use with the first embodiment of the invention.
Figure 9:
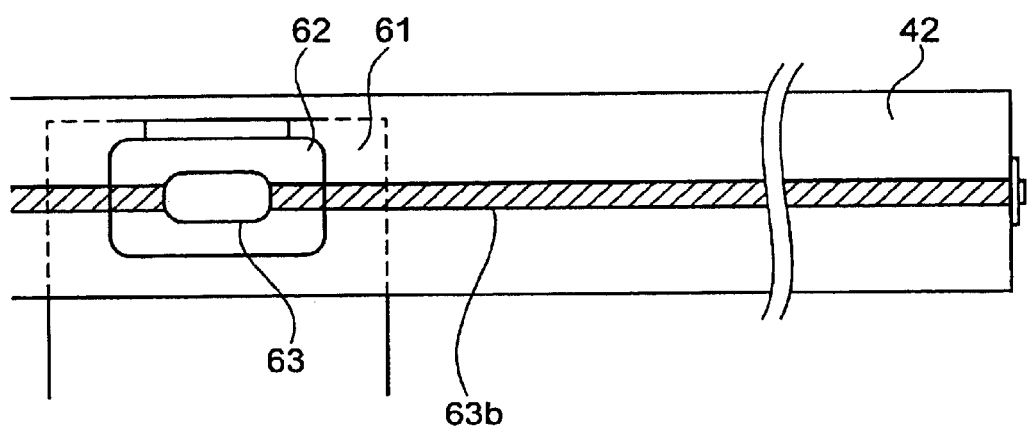
FIG. 9 shows a side view of an exemplary motor and worm gear arrangement that may be used with the exemplary embodiments of FIGS. 2, 3, 5 and 6.

FIG. 5 shows an alternative embodiment of the adjustable pedal position mechanism of FIG. 2 which incorporates structure essentially identical to that of FIG. 2 except that the cable 36 is coupled at one end to the anchor 38 while the other end of the cable 36 is coupled to a lever 54 which is pivotally coupled to the fire wall 40 via a mount 56. The lever 54 is positioned adjacent a member 58 which, when depressed, may operate either an electric switch sending a signal corresponding to a degree of depression of the pedal 4 to the vehicle control device via the actuator 98a which actuates a vehicle control device as is known in the art. In addition, the adjustable pedal position mechanism of FIG. 5 may be coupled, for example, via the motor and worm gear arrangement 61 of FIG. 9, which includes the worm gear arrangement 63 having a gear 63a and a gear shaft 63b, and the servo motor 62 for automatically adjusting the position of the pedal 4. The motor and worm gear arrangement 61 of FIG. 9 may also, for example, be used with the exemplary embodiments of FIGS. 2, 3 and 6. Specifically, the servo motor 62 operates based on input from the driver to move the pedal 4 forward or rearward to the desired position and to lock the pedal 4 in the desired position. Alternatively, the servo motor may be operated based on memory stored in a CPU of a vehicle control system to select a predetermined pedal position (or pedal and seat position) based on predetermined preferences for the current driver. Of course, for such systems with the pedal position adjusted in accord with commands from a CPU, the seat position and pedal position may be automatically controlled in accord with criteria stored in a memory to ensure that the minimum safe clearance is maintained.

As a substitute for the servo motor 62 of FIG. 5, any suitable automatically operable power source may be employed to automatically adjust the position of the pedals 4 employing any number of suitable mechanisms such as those employed, for example, with powered seats.

Figure 6:
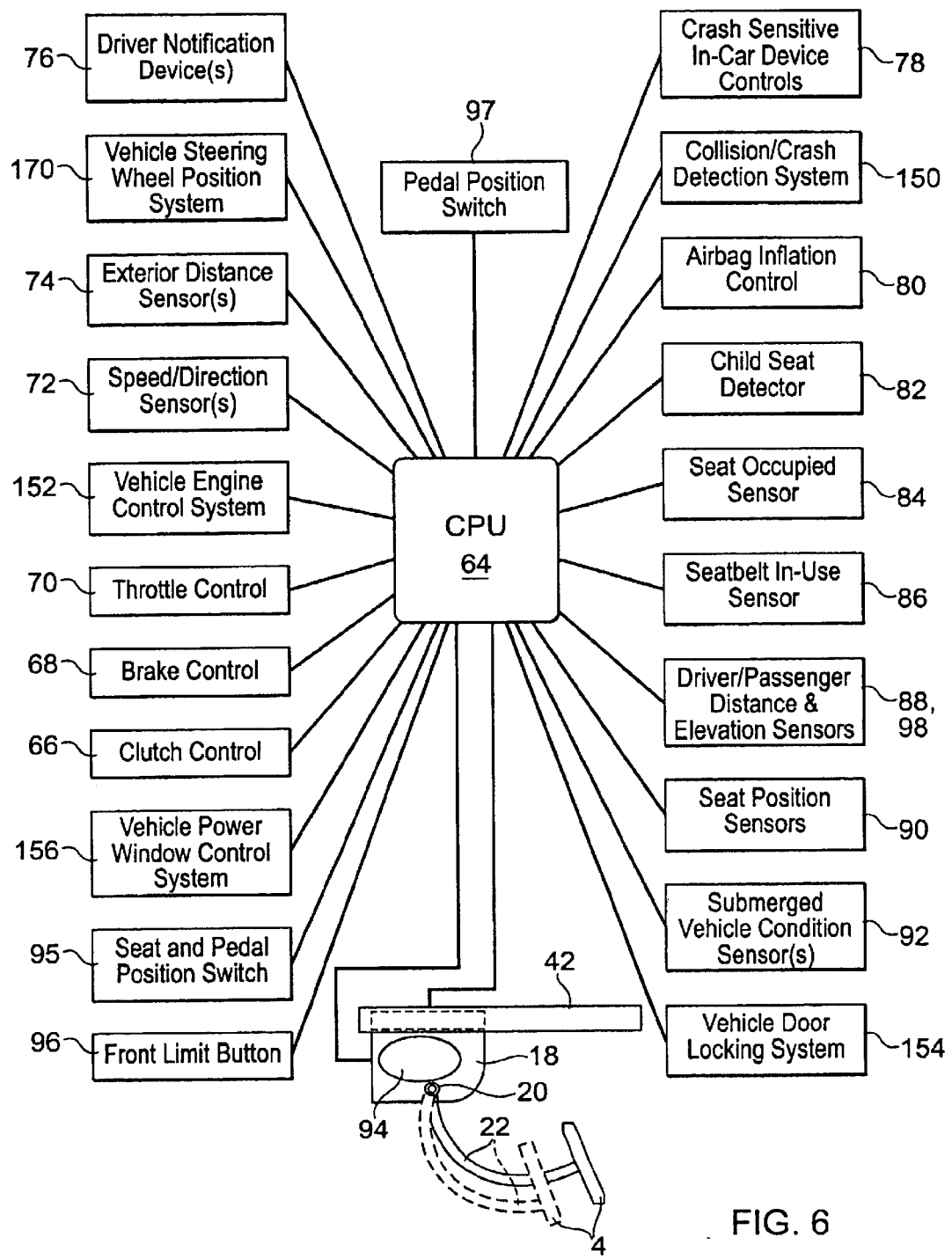
FIG. 6 shows a plan diagram of a computer controlled vehicle safety system according to the exemplary embodiment and/or exemplary method of the present invention.

As shown in FIG. 6, an adjustable pedal position mechanism as in FIG. 5, may be integrated into a computerized vehicle safety system operated by a processor arrangement 64, which may be a microprocessor arrangement, an ASIC processor arrangement or any other suitably appropriate processor arrangement, which is used to monitor and/or control various vehicle functions, as well as vehicle conditions, external conditions (including road and environmental conditions), operating information and/or status information.

The processor arrangement 64 is coupled to a multiplicity of vehicle control devices including, for example, a clutch control 66, a brake control 68, a throttle control 70, operating condition sensors including, for example, speed and direction sensors 72 and exterior distance sensors 74. In addition, the processor arrangement 64 is coupled to vehicle safety components including, for example, driver notification devices 76; crash sensitive in-car device controls 78 which may, for example, control door and seat belt unlocking, window opening, motor shut-off, placement of 911 calls; and an air-bag inflation control system 80; and sensors supplying information to the vehicle safety system including, for example, a child seat detector 82, a seat occupied sensor 84, a seat belt in use sensor 86, driver/passenger distance and elevation sensors 88, 98, seat position sensors 90 and submerged vehicle condition sensors 92. The processor arrangement may also be coupled to a vehicle steering wheel position arrangement (or sensor system) 170, for use in determining the position of a telescoping vehicle steering wheel for use in determining the minimum clearance distance between an air-bag and a driver. The occurrence of a crash may be detected, for example, by the acceleration or other sensors used to activate the air-bags, roll-over sensors, etc.

In particular, a collision or crash detection arrangement or system 150 (which may be any suitably appropriate arrangement) may also be communicatively or operatively coupled to the processor arrangement or system 64, which may then operate to control various vehicle control arrangements and/or systems so as to configure or set them to appropriate post-collision configurations or settings. In particular, the processor arrangement 64, based on the collision information from the collision detection arrangement 150, may operate to control the following vehicle systems: vehicle engine control arrangement or system 152 to shut down the engine; vehicle door locking control arrangement or system 154 to unlock the vehicle door(s); vehicle power window control arrangement or system 156 to raise or lower the vehicle window(s); and vehicle communication arrangement or system 158 to request assistance using a suitably appropriate communication system, such as, for example, a cellular communication system (which may be, for example, the Tele-Aid™ system (from Daimler-Benz Corporation) or the OnStar™ system (from General Motors Corporation).

An alternative pedal position adjustment mechanism of FIG. 6 is substantially identical to the pedal position adjustment apparatus described in the previous embodiments except that instead of the cable coupled to an actuator via a first fixed pulley and a second movable pulley, a sensor 94 detects a degree of rotation of each of the pedals 4 about the axle 20. Each sensor 94 supplies an output signal corresponding to the angular position of the corresponding pedal 4 to the processor arrangement 64 which supplies a corresponding control signal to a vehicle control device corresponding to the particular pedal 4.

The computerized vehicle safety system of FIG. 6 may allow adjustment of both seat and pedal position through operation of a single switch 95 corresponding to currently employed seat position switches, but may be pre-programmed to prevent the driver from adjusting the seat to a position within the minimum safe clearance. As the driver operates the switch 95 to request a forward motion of the seat 2, the processor arrangement 64 operates the servo motor to direct a forward motion of the seat 2 until the driver reaches the minimum safe clearance (as determined by either a driver position sensor or a pre-set forward-most seat position). The processor arrangement 64 then halts the forward motion of the seat 2 locking the seat 2 in the forward-most position and begins moving the pedals 4 toward the driver until the driver indicates that a desired position of the pedals 4 has been achieved. The processor arrangement 64 then directs the adjustable pedal position mechanism to lock the pedals 4 in the desired position. Alternatively, the system of FIG. 6 may also include a separate pedal position switch 97 allowing the passenger to adjust the position of the pedals 4 regardless of the current position of the seat 2.

Even in view of the minimal travel and limited use of motorized telescopic steering wheels, such a system may be interfaced to the processor arrangement 64 to retract as necessary, prior to advancing the pedals towards the driver.

As described above, an exemplary embodiment of the present invention may use, as an alternative to a predetermined forward-most seat position based on a minimum adult chest depth, an electronic passenger distance sensor 88 to monitor, such as, for example, chest to air-bag distance. The processor arrangement 64 then monitors the chest to air-bag distance and controls motion of the seat 2 and the pedals 4 to maintain the minimum safe clearance. Upon detecting the minimum safe distance has been achieved, forward seat motion is halted and all further motion request of the driver is transferred to the servo motor 62. In addition, although the seat is prevented from moving forward beyond the minimum safe clearance, if a driver or passenger moves his body relative to the seat to temporarily encroach beyond the minimum safe clearance, the processor arrangement 64 may control the air-bag inflation control 80 to cause it to operate in a reduced clearance mode in which, under predetermined conditions, the system may, for example, reduce an inflation pressure, disable the air-bag or deploy the air-bag in staged inflation until the driver or passenger returns beyond the minimum safe clearance. When the driver has returned beyond the minimum safe clearance, the system discontinues the reduced clearance mode operation.

Upon an adjustment for rear movement of the seat 2 being called for, the processor arrangement 64 directs operation in reverse of that employed for forward motion of the seat 2. That is, when the servo motor 62 is operated to retract the pedals 4 (toward the front of the vehicle), until the forward-most position of the pedals 4 is reached. Then processor arrangement 64 directs additional distance adjustments by moving the seat 2 rearward.

An optional front limit button 96 permits a driver to select as a personal forward-most position, any position of the seat 2 in which the passenger seated therein is separated from the air-bag by at least the minimum safe clearance and to make adjustments for leg length by moving the pedals 4 rearward. This allows drivers of all sizes to take advantage of a more rearward pedal position thereby reducing the possibility of lower limb injury.

The present design of "seat slide only" adjustment has also resulted in visual limitations to drivers of small stature as shorter drivers stretch to reach the pedals 4. This need to stretch in turn limits the amount of seat elevation that can be physically used.

It is believed, however, that rearward adjustment of the position of the pedals 4 offered by the exemplary embodiment of the present invention may eliminate such stretching, and may allow a full range of seat elevation to be employed by all drivers regardless of height, permitting all to obtain optimum design eye level.

An elevation sensor 98 may be coupled to the processor arrangement 64 positioned within the passenger compartment to detect an actual height of a driver's head. The elevation sensor 98 may employ technology such as ultrasonic sensors similar to sensors included in commercially available distance meters. Using a standard value representing an average difference between a height of the top of a person's head and their eyes, (such as, for example, 4") an optimum eye elevation position may be automatically obtained as the processor arrangement 64 directs an electric motor (not shown) in the seat 2 to elevate the seat 2 until the elevation sensor 98 indicates that the optimum eye level has been obtained. As shown in FIGS. 1A and 1B, a distance NN1 from the sensor 98 (roof position) to a point corresponding to 4 inches below a top of the head is believed to correspond to an optimal or at least a good distance NN2 of the sensor 98 with respect to the top of the head.

Thus, the exemplary embodiment of the present invention provides an automatic driver seat positioning system (DPS), which uses both front and elevation sensors to automatically position the driver in an optimum visual and air-bag protection position.

Although the described exemplary embodiments show overhead or dashboard slung foot pedals and a pedal position adjustment mechanism adapted thereto, the exemplary embodiments and/or exemplary methods of the present invention may also be applied in vehicles with floor mounted pedals or other pedal mounting arrangements, so long as a combination of pedal movement and seat movement is provided to ensure that a minimum safe clearance between the driver or other passenger and an air-bag is maintained. In addition, though the described embodiments and examples refer to driver seat control and a steering wheel located air-bag, the same concepts may be applied to other passenger seating and air-bag arrangements to maintain a minimum safe clearance between the passenger and the air-bag.

As indicated in FIG. 6, the processor arrangement 64 may be coupled to a plurality of vehicle systems to create an integrated vehicle safety system. Specifically, in addition to controlling the air-bag system and the seat and pedals to maintain a minimum safe clearance, the system of FIG. 6 may include, for example, sensors for determining whether a child seat is mounted on a particular seat, whether a particular seat belt is in use, the position of the seats, whether a vehicle is submerged or in another post-crash situation and systems for disabling the ignition of the vehicle after an accident, for automatically lowering the windows in a submerged vehicle situation, for unlocking the doors and unfastening the seat belts after an accident and for operating a cell phone and/or navigation system to make a call to 911.

The driver/passenger distance sensors 88 offer a practical method of controlling the inflation of multi stage and/or controlled inflation air-bags, when so equipped. Thus, for example, when the distance sensor 88 indicates that the minimum safe distance has been encroached upon, the corresponding air-bag would be activated at a reduced inflation rate. An optimum air-bag inflation activation and rate may be continuously computed by the processor arrangement 64 based upon input from sensors 72, 74, 82, 84, 86 and 88.

For example, encroachment beyond the minimum safe clearance, or the detection of a low speed impact, based upon exterior distance sensors 74 and vehicle speed, would initiate a lower inflation setting for the related air-bag. Thus, the system is further enhanced by interfacing with other systems that detect seat occupancy and/or active seat belt use, providing a continuous basis of multi-factor safe inflation evaluation.

It is believed that present foot pedal designs may vary considerably by auto manufacturer, and may therefore use cable control or rod control of gas, brake and clutch. In the exemplary embodiment, all of the foot pedals may be mounted on a single sliding platform located under dash, supported from the firewall and/or dash, and activated by either manual or motorized control as described above.

Combined with motorized control, the vehicle safety system of FIG. 6 may employ the sensors 98 and 88 to provide automatic, optimized driver positioning, regardless of weight or height.

This customized driver positioning system may be implemented by the processor arrangement 64 by, for example, activating seat/pedal position control in the following 3 steps: (1) The seat 2 is first returned to its lowest and rearward-most position; (2) After step 1 has been achieved, the seat 2 is then elevated to its optimum eye level position, that is, the point at which the distance indicated by elevation sensor 98 equals an optimum distance stored in memory; and (3) After steps 1 and step 2 have been completed, the seat 2 is advanced to its minimum safe position, the point at which the distance indicated by the distance sensor 88 is equal to a predetermined minimum safe distance stored in memory or, alternatively, by advancing the seat 2 to a preselected forward-most position.

These steps may be performed in any order. By adjusting the eye height first, however, this should eliminate or at least reduce inaccuracies in detecting the distance between the passenger and the air-bag that may result from the varying contour of the passenger (that is, some portions of the passengers anatomy may project further forward than others). Thus, if horizontal positioning is performed first, a later change in vertical position may alter the critical distance between the sensed portion of the passenger and the air-bag.

The driver would then adjust the pedals 4 to the most comfortable position by further activating the seat position activator.

Figure 8:
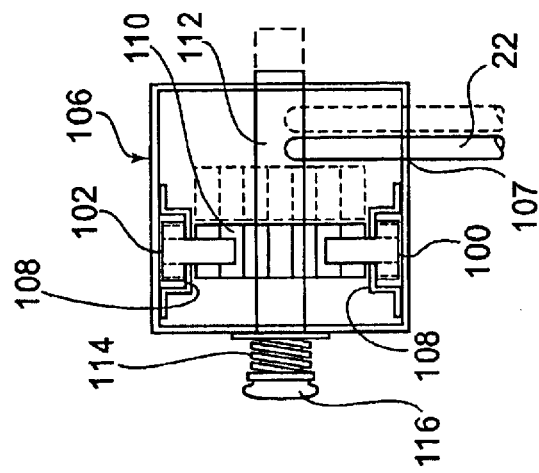
FIG. 8 shows a cross-sectional view of the pedal position adjustment mechanism of FIG. 7A and/or FIG. 7B taken on a plane perpendicular to that of FIG. 7A and/or FIG. 7B.
Figure 7A:
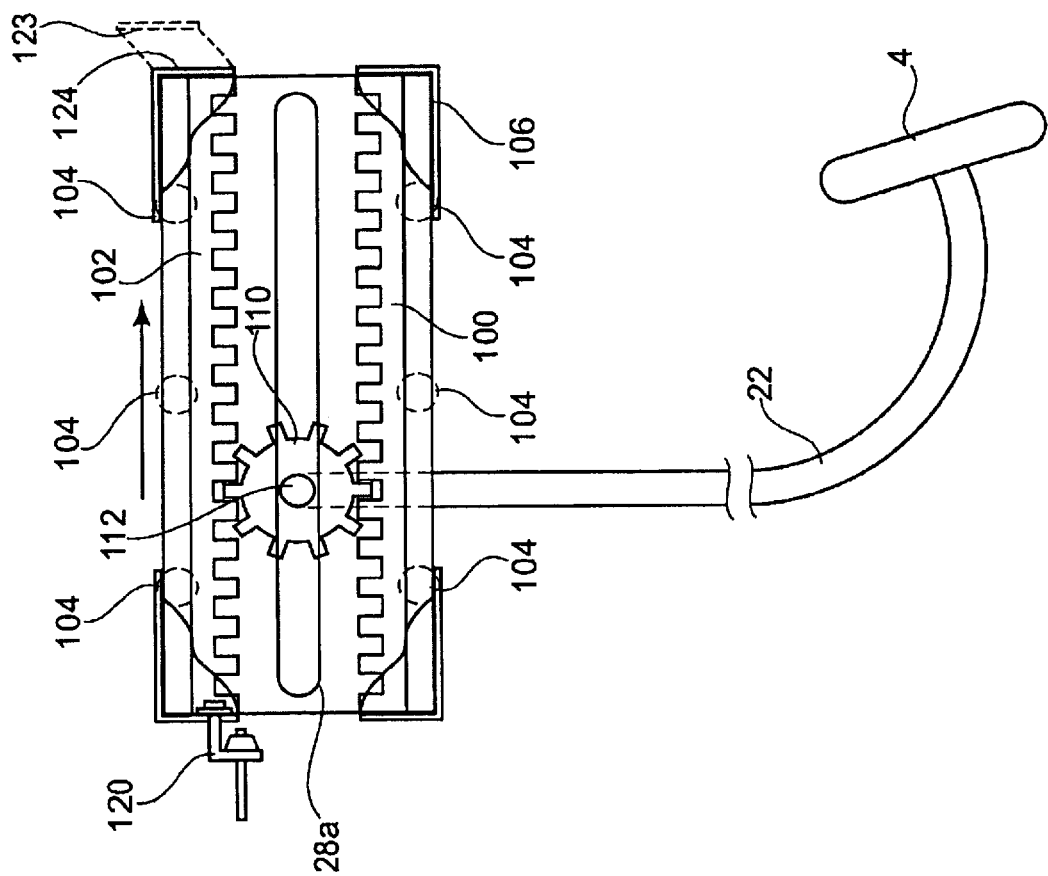
FIG. 7A shows a partially cross-sectional side view of a fourth pedal position adjustment apparatus for use with the first exemplary embodiment of the present invention.
Figure 7B:
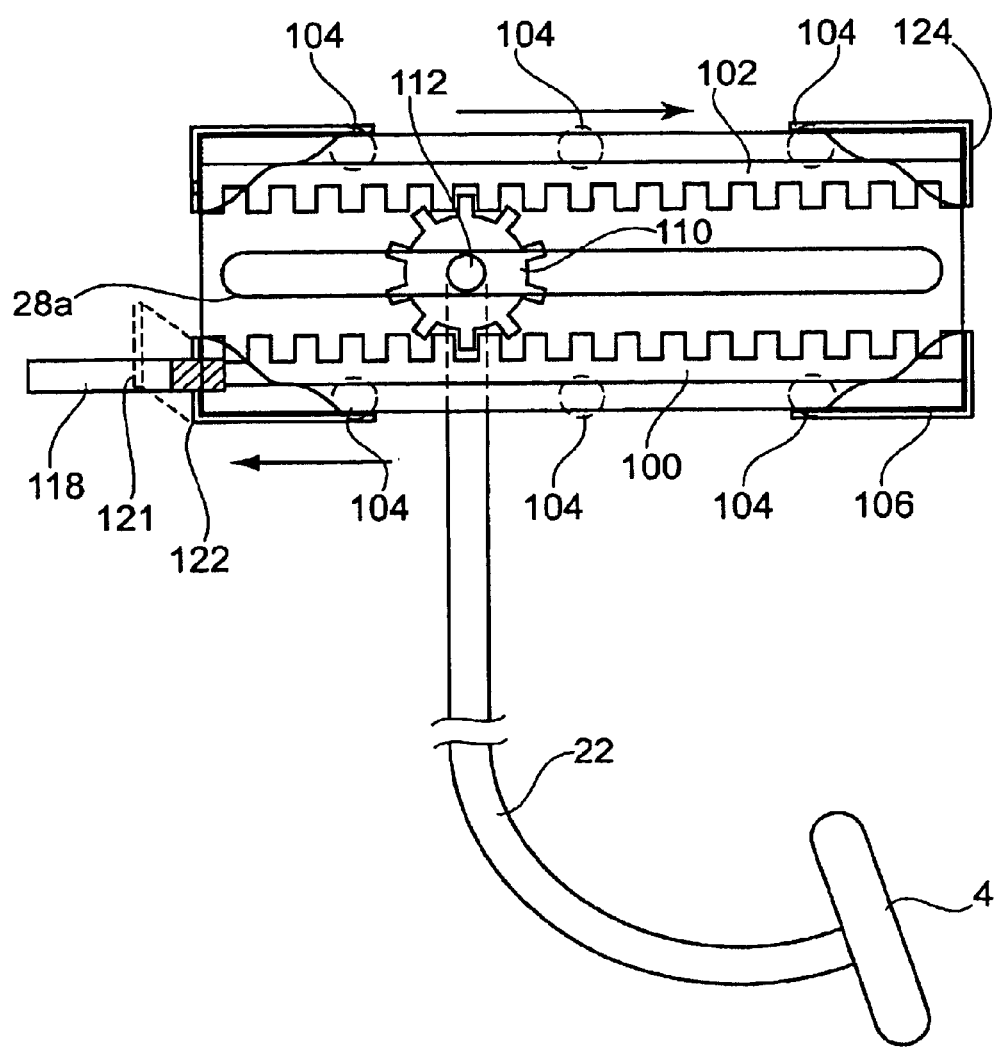
FIG. 7B shows a partially cross-sectional side view of another exemplary fourth pedal position adjustment apparatus for use with the first exemplary embodiment of the present invention.

FIGS. 7A, 7B and 8 show an alternative adjustable pedal position mechanism which eliminates the cable and pulley arrangements of FIGS. 2 and 3. Specifically, the adjustable pedal position mechanism of FIGS. 7A, 7B and 8 includes geared slides 100, 102 mounted on rollers 104 and mounted within a housing 106. The geared slides 100, 102 are maintained in position within the housing 106 by guides 108 with a circular gear 110 mounted therebetween. The circular gear 110 is non-rotatably coupled to the pedal rod 22 which extends into the housing 106 via an opening 107 and, consequently, to the pedal 4 by a pin 112 which rides in slots or channels 28a formed in opposed walls of the housing 106. The circular gear 110 is held in an engaged position between the geared slides 100,102 in which teeth of the circular gear 110 engage teeth of the slides 100, 102 by the bias of a spring 114 which abuts a knob 116 which extends out of the housing 106. The knob 116 is mounted on the pin 112 so that, when the knob 116 is pushed toward the housing 106 against the bias of spring 114, the circular gear 110 is moved to a disengaged position in which the teeth of the circular gear are out of engagement with the teeth of the slides 100, 102.

Thus, by depressing the knob 116, the circular gear 110 and the pedal 4 can be slid to any position along the length of housing 106. Upon releasing the knob 116, the teeth of the circular gear 110 again engages the teeth of slides 100, 102 and the pedal 4 is locked in a new position. When the pedal 4 is depressed, the pedal rod 22 rotates the circular gear 110 (clockwise as seen in FIGS. 7A and 7B) which can cause either the slide 100 to slide forward (to the left in FIG. 7B) or the slide 102 to slide rearward (to the right in FIG. 7B) depending on which of stops 121 and 123 has been removed. In particular, as shown in the appropriate Figures, stop 123 is removed for the cable pull arrangement of FIG. 7A, and stop 121 is removed for the push rod arrangement of FIG. 7B. The force applied by the pedal 4 to the slides 100, 102 may be applied by the slide 100 to a push rod connector 118, as in FIG. 7B, or by the slide 102 to a pull cable 120, as in FIG. 7A, and that this force may then be transmitted to an actuator for a corresponding vehicle control device.

One of removable stops 121, 123 is thus used at the respective corner 122, 124 to allow either pull cable or push rod control action selection. For example, removal of stop 121 directs all pedal motion to a forward motion of slide 100 using a rod connector 118 while removal of stop 123 directs all pedal motion to a rearward motion of slide 102 which uses a cable connector 120.

As with the exemplary embodiments described above, although manual adjustment has been described in regard to the adjustable pedal position mechanism of FIGS. 7A, 7B and 8, motorized control would provide similar action and could be implemented with similar structure. In addition, the exemplary embodiment of the present invention is compatible with any alternative mechanisms for using pedal motion to operate a vehicle control device (such as, for example, hydraulic systems).

While a separate motor may be used for the foot pedal track, it could also be accomplished by direct connection to the seat drive, such as in a cable shaft drive common to speedometers. While overhead slung pedals are shown, floor mounted pedals are intended to have similar controls.

Similar seat and distance sensors are suggested for other air-bag protected passengers, to maintain a safe air-bag distance. These distance detectors could be set to halt forward seat movement and issue an audible and/or visible warning when the minimum safe distance is encroached upon.

In addition, braking and accelerator controls may be further monitored and acted upon by the processor arrangement 64 based upon input from the Exterior Distance Sensors 74 in conjunction with Speed and Direction Sensors 72. For example, if the Speed and Direction sensors 72 and related Exterior Distance Sensors 74 detect imminent impact, additional braking forces may be activated via brake control 68.

All safety threats detected by the processor arrangement 64 may also be conveyed to the driver by an audio and/or visual alert system.

Figure 11:
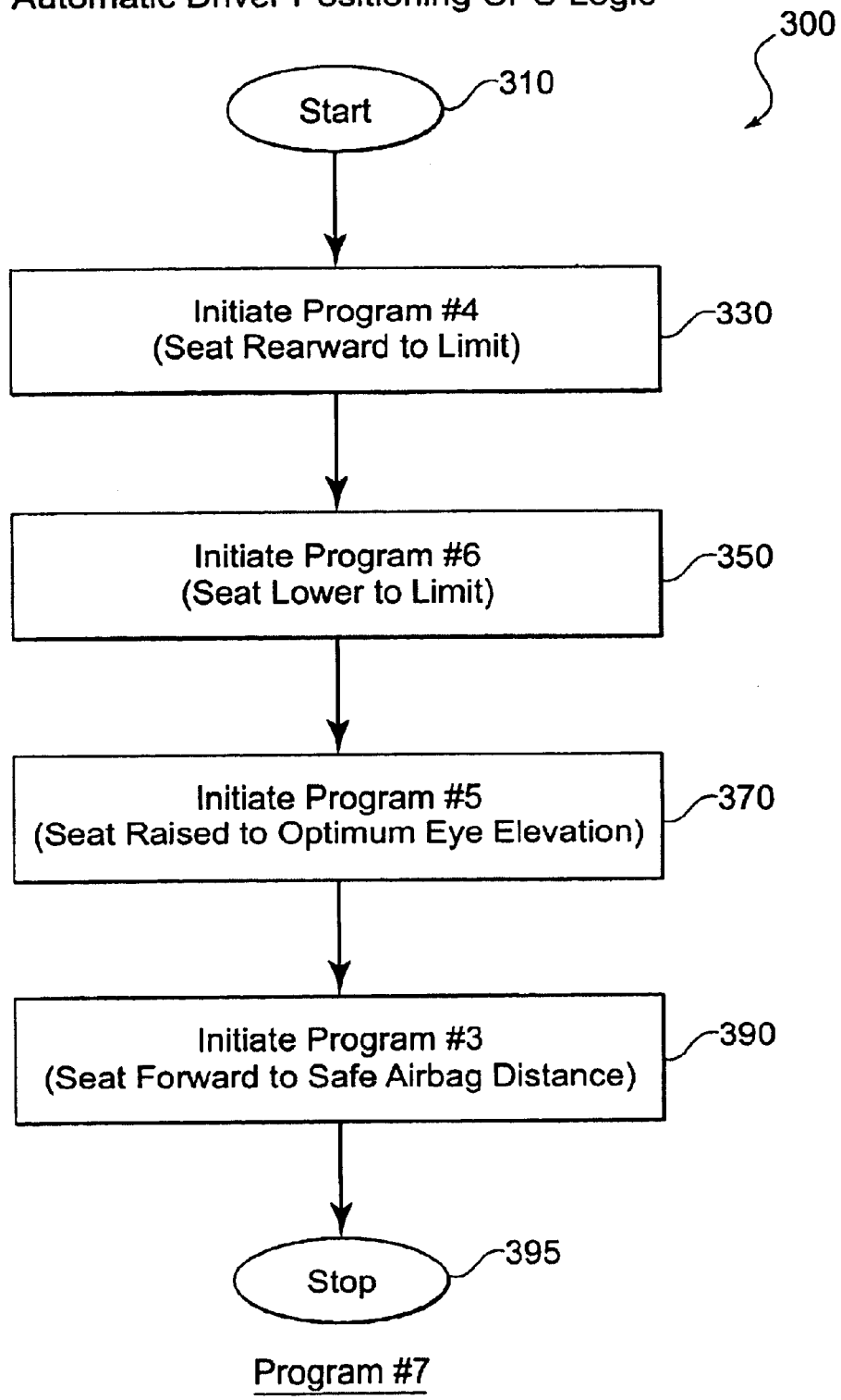
FIG. 11 shows a method or program #7 for providing automatic driver positioning using the methods or programs of FIGS. 12C to 12F.
Figure 12A:
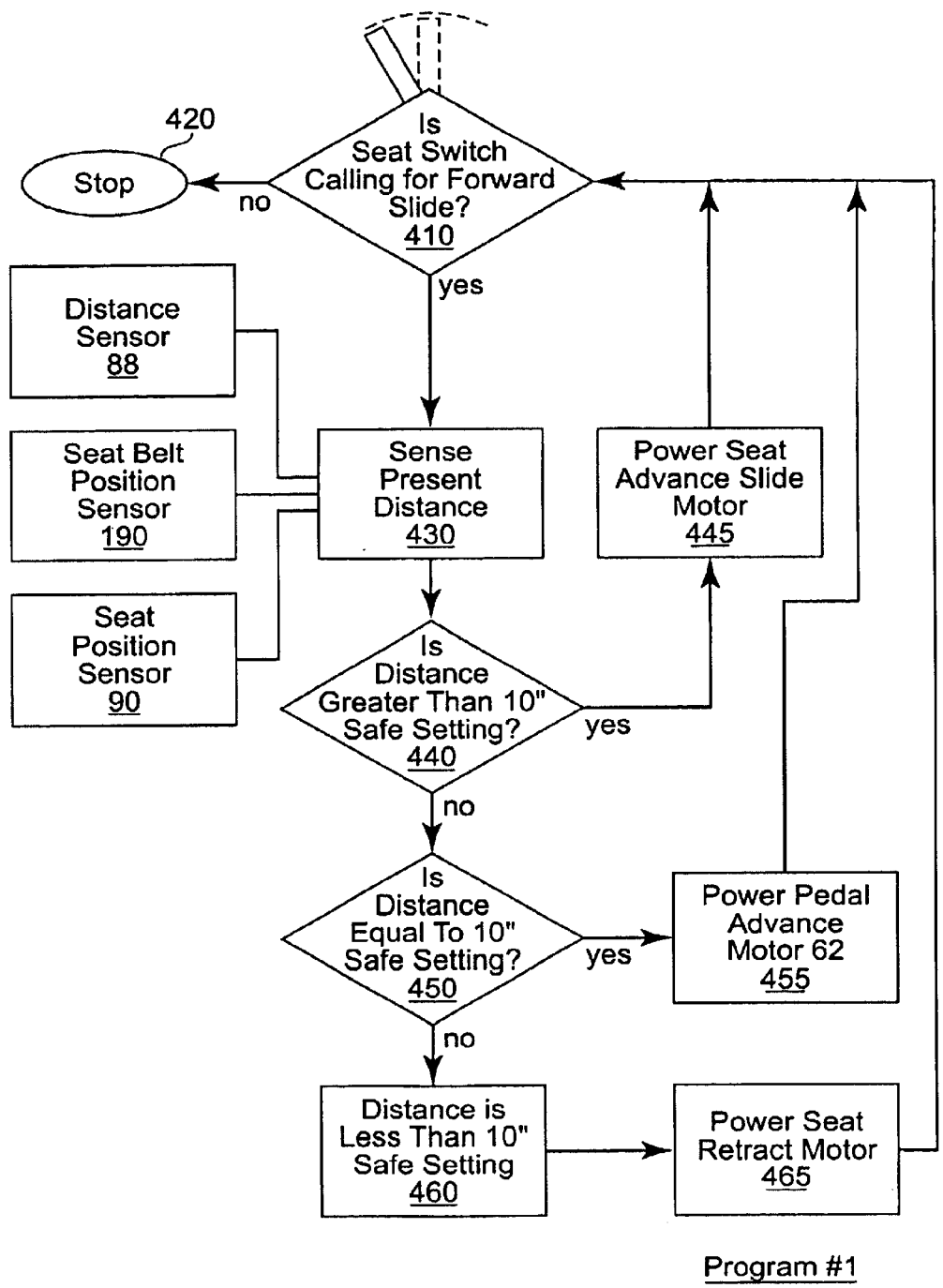
FIG. 12A shows a method (program #1) for moving a vehicle seat forward based on a person using the operator controlled seat slide switch or controller arrangement.
Figure 12B:
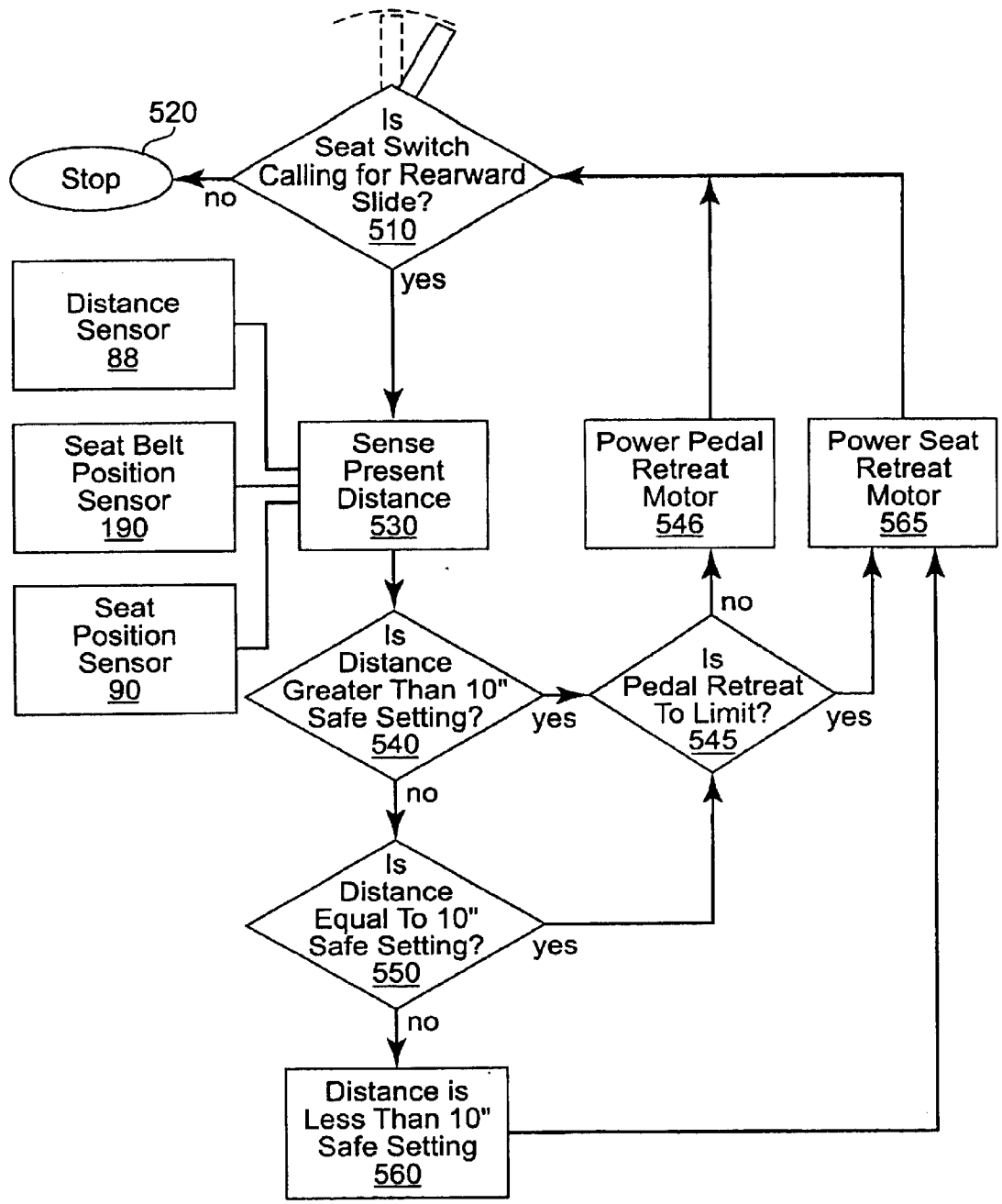
FIG. 12B shows a method (program #2) for moving a vehicle seat rearward based on a person using the operator controlled seat slide switch or controller arrangement.

The processor arrangement 64 is operable to perform a method or program for providing automatic driver positioning, instead of the operator controlled operation of the vehicle seat positioning control arrangement (as shown with Program #1 of FIG. 12A and Program #2 of FIG. 12B. In particular, FIG. 11 shows a method or program 300, namely Program #7 : Automatic Driver Positioning Processor (CPU) Logic.

In step 310, the program is initiated or is started. Next, in step 330, the processor arrangement 64 initiates operation of a sub-method or sub-program, namely Program #4 of FIG. 12D, in which the vehicle seat is moved rearward to its rearward position limit. Next, in step 350, the processor arrangement 64 initiates operation of a sub-method or sub-program, namely Program #6 of FIG. 12F, in which the seat is lowered to its lowest position limit. Next, in step 370, the processor arrangement 64 initiates operation of a sub-method or sub-program, namely Program #5 of FIG. 12E, in which a raising movement of a vehicle seat is limited depending on whether the sensed or determined distance between the interior vehicle roof-liner and the head of an occupant is less than, equal to or greater than the head elevation distance NN2, where NN2 may again be the known vertical distance NN1 (defined herein) less a distance of about 4". By initiating Program #5, the processor arrangement 64 may be used to raise the vehicle seat to provide an optimum or at least improved eye elevation). Next, in step 390, the processor arrangement 64 initiates operation of a sub-method or sub-program, namely Program #3 of FIG. 12C, in which forward movement of a vehicle seat is limited depending on whether the sensed or determined distance between the air-bag and an occupant is less than, equal to or greater than a minimum enforceable distance, which may be about 10". Finally, the processor arrangement 64 performs step 395 in which program operation is ended or stopped.

If automatic driver positioning is not being used and if the operator is controlling forward motion of the vehicle seat in block 410 (if not, the program is stopped in block 420), the processor arrangement 64 performs Program #1 (400) of FIG. 12A. In this case, if in blocks 430 and 440 the sensed or determined distance (based on inputs from distance sensor 88, seat belt position sensor 190 and/or seat position sensor 90) is greater than some minimum distance or setting (which may be about 10"), the processor arrangement 64 operates to enable operation of the seat advancing or forward positioning motor in block 445. This may be done, for example, by enabling the supply of power to the seat advancing or forward positioning motor in block 445. If in block 450 the sensed or determined distance is equal to or about the same as the minimum distance or setting (which may be about 10"), the processor arrangement 64 operates to enable operation of the pedal advancing or forward positioning motor 62 in block 455. This may be done, for example, by enabling the supply of power to the pedal advancing or forward positioning motor 62 in block 455. If in block 460 the sensed or determined distance is less than some minimum distance or setting (which may be about 10"), the processor arrangement 64 operates to enable operation of the seat retracting or rearward positioning motor in block 465. This may be done, for example, by enabling the supply of power to the seat retracting or rearward positioning motor in block 465.

If automatic driver positioning is not being used and if the operator is controlling rearward motion of the vehicle seat in block 510 (if not, the program is stopped in block 520), the processor arrangement 64 performs Program #2 (500) of FIG. 12B. In this case, if in blocks 530 and 540 the sensed or determined distance (based on inputs from distance sensor 88, seat belt position sensor 190 and/or seat position sensor 90) is greater than some minimum distance or setting (which may be about 10"), the processor arrangement 64 operates to enable operation of pedal retracting motor 62 to its limit in block 546, after which the seat retracting or rearward positioning motor may be operated (if the system determines the pedal is at its limit in block 545) to its limit in block 565. This may be done, for example, by enabling the supply of power to the pedal retracting motor 62 in block 546, and thereafter to the seat retracting or rearward positioning motor in block 565. If in block 550 the sensed or determined distance is equal to or about the same as the minimum distance or setting (which may be about 10"), the processor arrangement 64 operates to enable operation of the seat retract or rearward positioning motor in block 565 if pedal retreat is at its limit in block 545. This may be done, for example, by enabling the supply of power to the seat retracting or rearward positioning motor in block 565, or by enabling the supply of power to the pedal retreat motor in block 546 if pedal retreat is not at its limit in block 545. If in block 560 the sensed or determined distance is less than some minimum distance or setting (which may be about 10"), the processor arrangement 64 operates to enable operation of the seat retracting or rearward positioning motor in block 565. This may be done, for example, by enabling the supply of power to the seat retracting or rearward positioning motor in block 565.

Figure 12C:
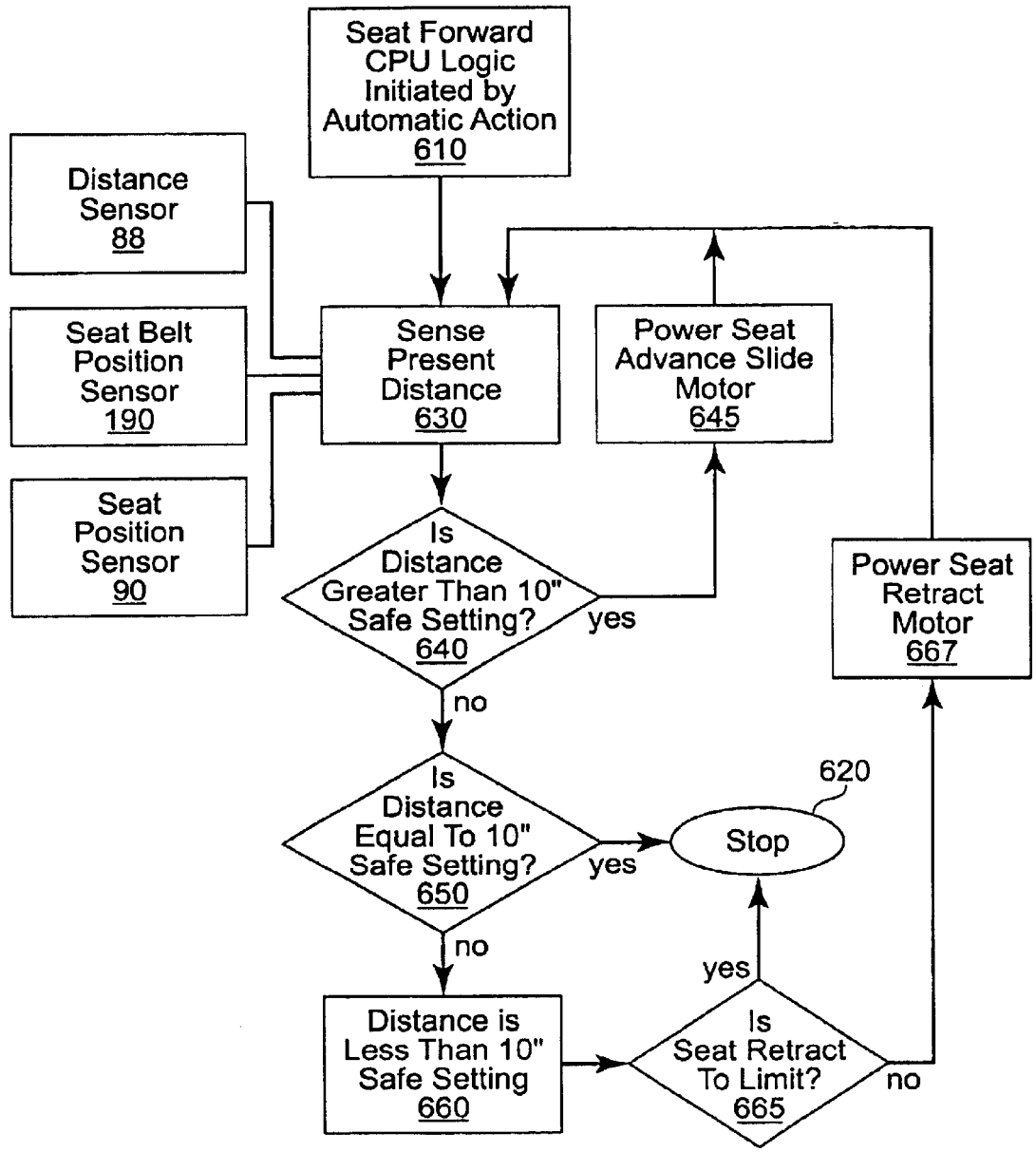
FIG. 12C shows a method (program #3) for moving a vehicle seat forward based on using automatic action or control of a seat slide switch or controller arrangement.
Figure 12D:
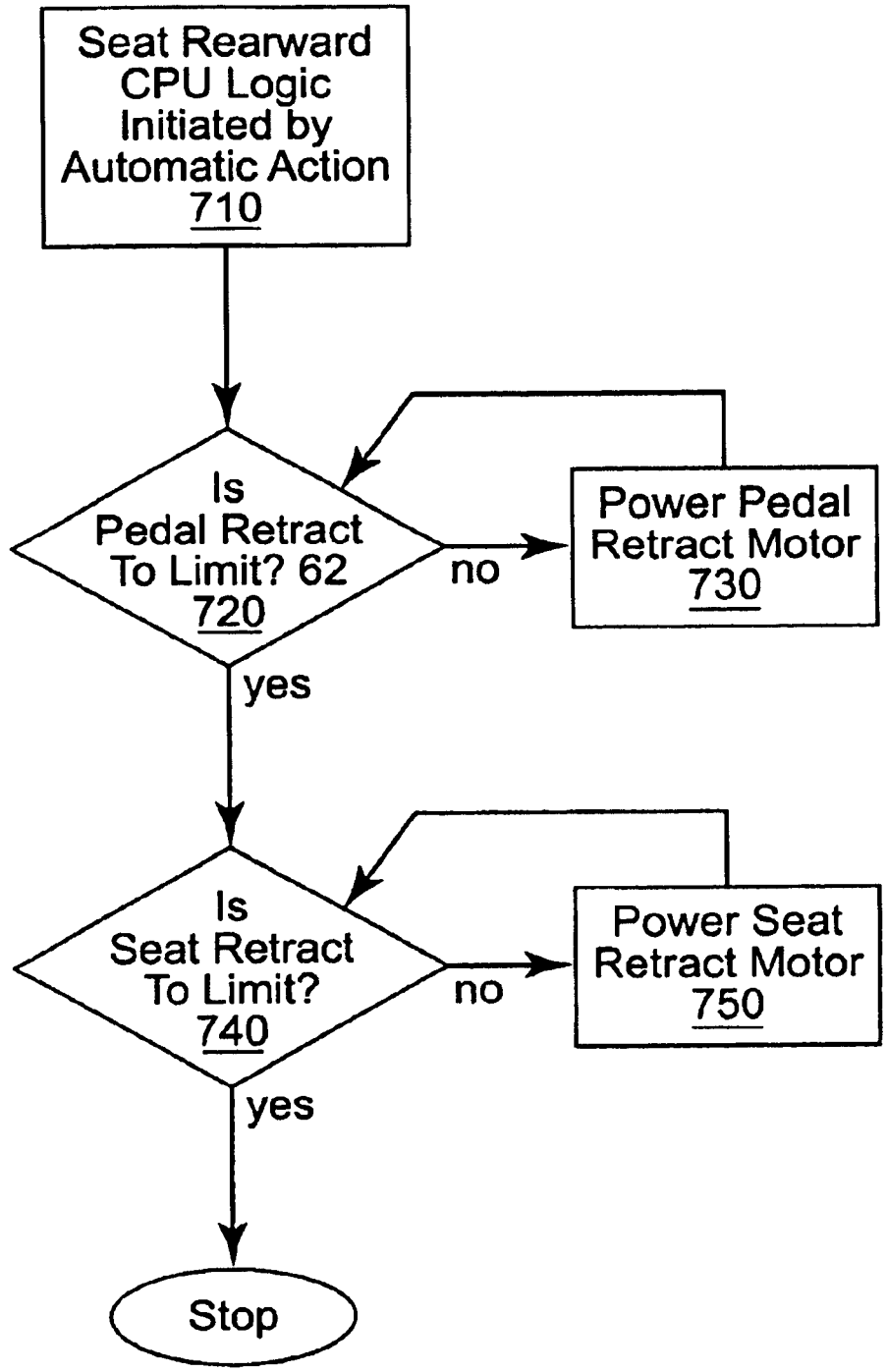
FIG. 12D shows a method (program #4) for moving a vehicle seat rearward based on using automatic action or control of the seat slide switch or controller arrangement.

As described, in step 330, the processor arrangement 64 initiates operation of a sub-method or sub-program, namely Program #4 (700) of FIG. 12D, so that if automatic driver positioning is being used and if the operator is not controlling rearward motion of the vehicle seat in block 710, the processor arrangement 64 performs Program #4 of FIG. 12D. In this case, the processor arrangement 64 operates to enable operation of pedal retracting motor 62 to its limit in blocks 720 and 730, after which the seat retracting or rearward positioning motor may be operated to its limit in blocks 740 and 750. This may be done, for example, by enabling the supply of power to the pedal retracting motor 62 in block 730, and thereafter to the seat retracting or rearward positioning motor in block 750.

Figure 12E:
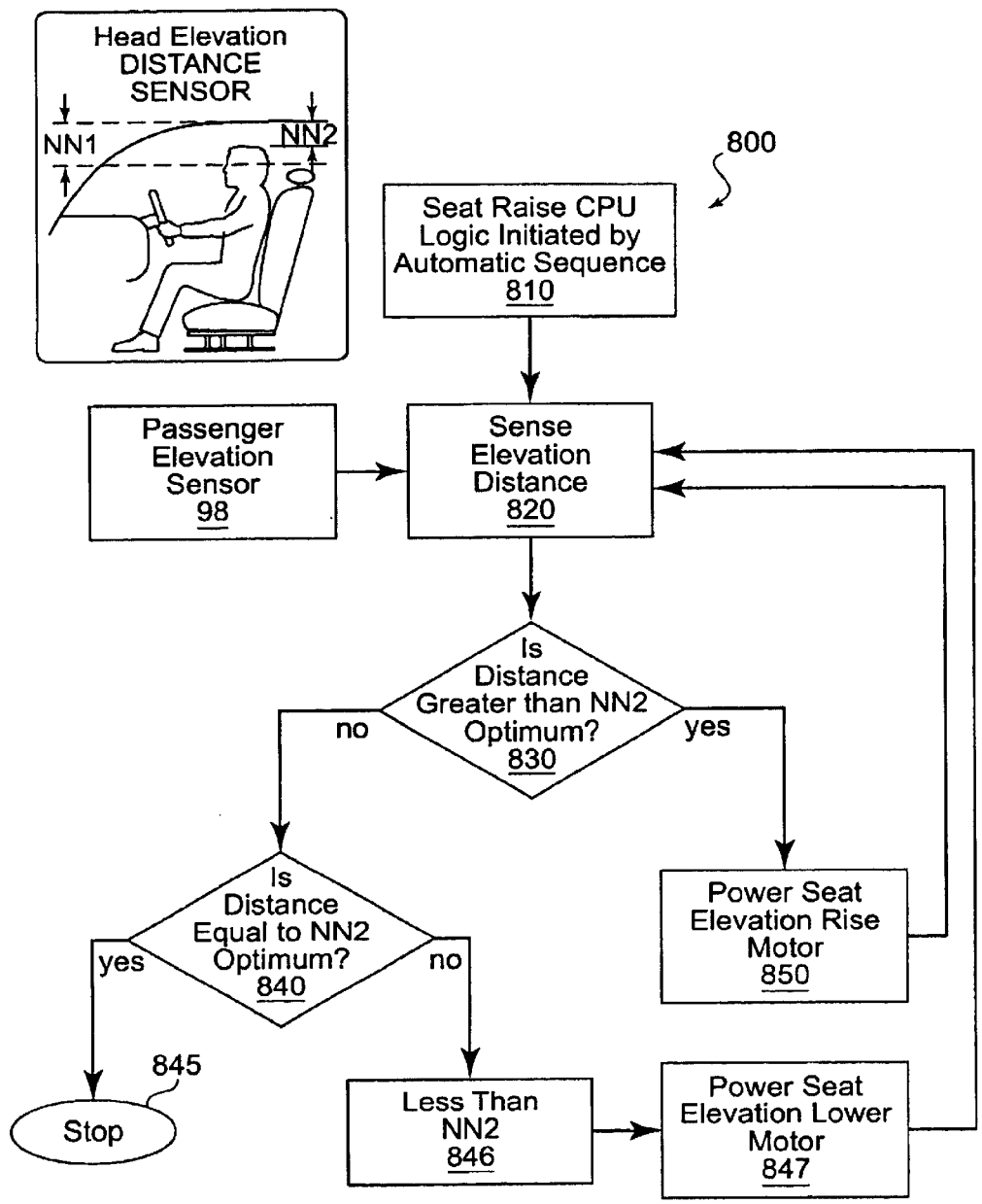
FIG. 12E shows a method (program #5) for moving a vehicle seat upward based on manual action/control or automatic action/control of the seat vertical movement switch or controller arrangement.
Figure 12F:
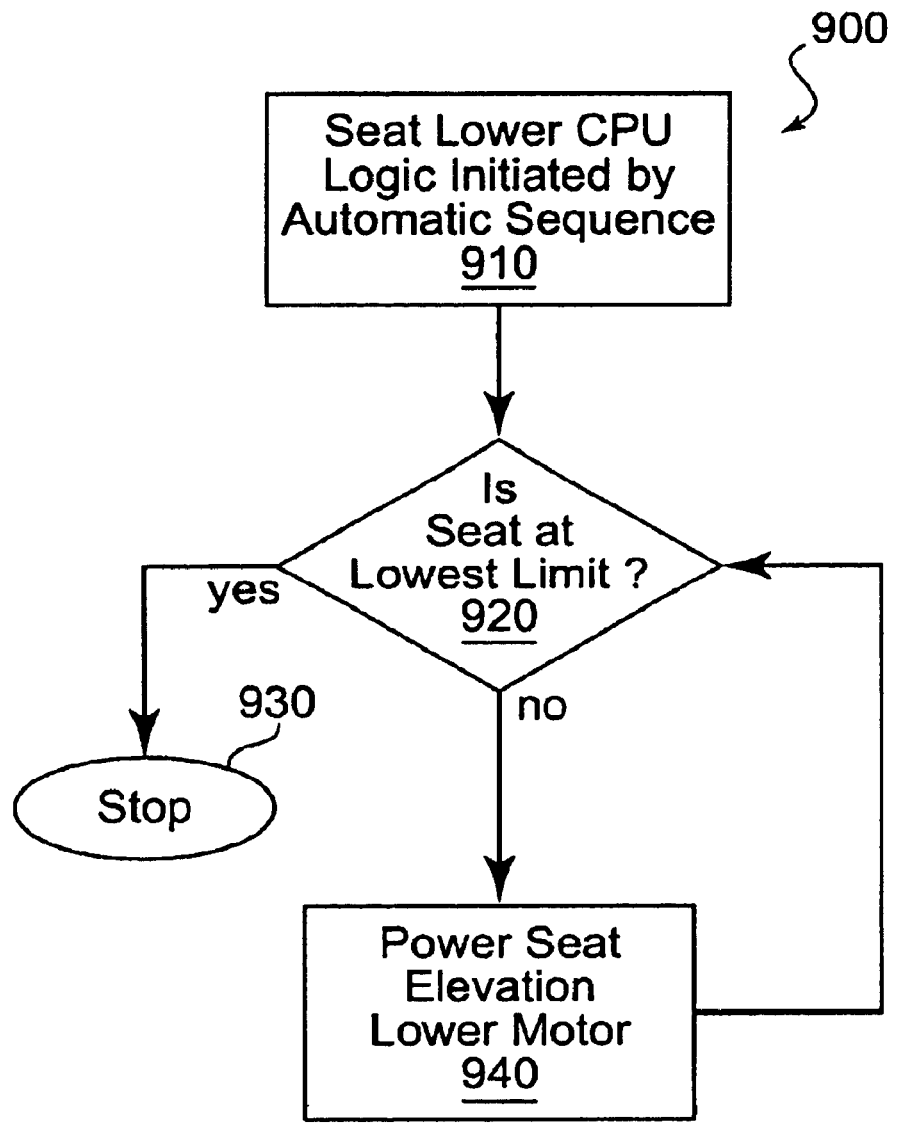
FIG. 12F shows a method (program #6) for moving a vehicle seat downward based on manual action/control or automatic action/control of the seat vertical movement switch or controller arrangement.

As described, in step 350, the processor arrangement 64 initiates operation of a sub-method or sub-program, namely Program #6 (900) of FIG. 12F, in which the vehicle seat is lowered to its lowest position. In block 910, the processor arrangement (or CPU logic) is initiated by automatic sequence. In block 920, the system determines if the vehicle seat is at its lowest position limit. If the seat is at its lowest position limit, the program is stopped in block 930. If not, the power seat elevation motor is operated to lower the vehicle seat in block 940.

As described, in step 370, the processor arrangement 64 initiates operation of a sub-method or sub-program, namely Program #5 (800) of FIG. 12E, in which a raising movement of a vehicle seat is limited depending on whether the sensed or determined distance between the interior vehicle roof-liner and the head of an occupant is less than, equal to or greater than the head elevation distance NN2, where NN2 may again be the known vertical distance NN1 (defined herein) less a distance of about 4". By initiating Program #5, the processor arrangement 64 may be used to raise the vehicle seat to provide an optimum or at least improved eye elevation) in block 810. In particular, if in block 820 the sensed elevation distance is greater than the head elevation distance NN2 in block 830, the processor arrangement 64 operates to cause the vehicle seat positioning arrangement to raise or increase the height of the vehicle seat in block 850. When the distance is equal to or about the same as the head elevation distance NN2 in block 840, the processor arrangement 64 operates to cause the vehicle seat positioning arrangement to stop and hold its position in block 845. If the distance is less than the head elevation distance NN2 in block 846, the processor arrangement 64 operates to cause the vehicle seat positioning arrangement to lower or decrease the height of the vehicle seat in block 847 unless it has been lowered to its limit. This logic or method of FIG. 12E may be initiated by the method or program of FIG. 11, but may also be initiated by the operator.

As described, in step 390, the processor arrangement 64 initiates operation of a sub-method or sub-program, namely Program #3 (600) of FIG. 12C, so that if automatic driver positioning is being used and if the operator is not controlling forward motion of the vehicle seat, the processor arrangement 64 performs Program #3 (600) of FIG. 12C, beginning at block 610. In this case, if in blocks 630 and 640 the sensed or determined distance (based on the information from distance sensor 88, seat belt position sensor 190 and/or seat position sensor 90) is greater than some minimum distance or setting (which may be about 10"), the processor arrangement 64 operates to enable operation of the seat advancing or forward positioning motor in block 645. This may be done, for example, by enabling the supply of power to the seat advancing or forward positioning motor in block 645. If the sensed or determined distance is equal to or about the same as the minimum distance or setting (which may be about 10") in block 650, the processor arrangement 64 operates to disable operation of the seat advancing or forward positioning motor, to stop advancement of the vehicle seat in block 620. This may be done, for example, by disabling the supply of power to the seat advancing or forward positioning motor in block 620. If the sensed or determined distance is less than some minimum distance or setting (which may be about 10") in block 660, the processor arrangement 64 operates to enable operation of the seat retracting or rearward positioning motor in block 667 (if the vehicle seat is not retracted to its limit in block 665). This may be done, for example, by enabling the supply of power to the seat retracting or rearward positioning motor in block 667.

As an alternate to the electronic distance sensor described above, the seat belt extraction system described herein may also be used to determine and maintain the safe distance between air bag and driver.

Figure 10A:
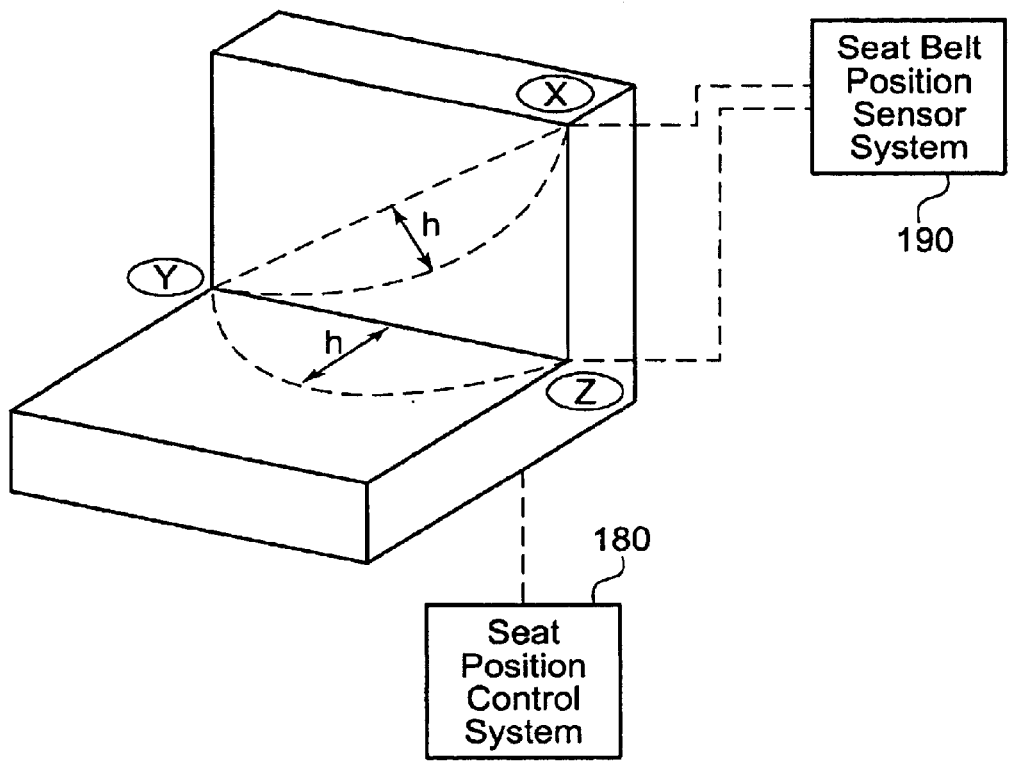
FIG. 10A shows the path of a lap belt and a shoulder belt with respect to a vehicle seat.

As described above, a minimum distance between an air-bag and a seated person may be about 10–, and where the body of the person protrudes about 8" with respect to the seat, this means the distance between the air-bag and the seat-back must be at least about 18". Since body shapes may vary, so will the effective protrusion of a person. Thus, the protrusion may be, for example, about 7", 8", 10" or more. The processor arrangement 64 may be used to determine a specific protrusion estimate for a person, to take into account or consider the varying effective minimum distance between an air-bag and a seat-back, so as to maintain the effective or net minimum distance of about 10" between the air-bag and a person. The processor arrangement 64 may use this information to control movement of the seat using the horizontal and vertical seat position control system 180, as shown in FIGS. 6 and 10A, and/or the driver/passenger distance sensor 88 (as shown in FIG. 6).

In particular, a seat belt position arrangement or sensor system 190 may be used to provide seat belt length use information for a particular person to the processor arrangement 64. The processor arrangement 64 may then use this information to determine the effective protrusion or depth with respect to the seat-back (that is, the protrusion estimate), rather than a predetermined or fixed protrusion estimate. Using the information from the seat position sensors 90 and either the estimated protrusion (or the predetermined protrusion if, for example, there is a fault in the system), as well as the vehicle steering wheel position arrangement or system 170 (if there is a telescoping and/or tilting steering wheel), the processor arrangement 64 may be used to control or limit operation of the seat position control system 180, as well as the telescoping and/or tilting steering wheel 88 (prior to advancing the pedals towards the driver).

The processor arrangement 64 may be used to determine the protrusion estimate using a seat belt extraction length based on the information from the seat belt position arrangement or sensor system 190 (to estimate safe distance positioning of a vehicle occupant). As explained, the protrusion of the chest or body of a person may vary from on the order of about 8" to 11" or more. The following describes a method for establishing a protrusion table or for using "protrusion" equations, so that the processor arrangement may, in either case, directly estimate an estimated protrusion (and therefore a minimum distance seating position (accounting for seat slide/position and/or steering wheel position for a telescoping and/or tilting steering wheel)) based on an extracted length of seat belt.

Using the relationship of intersecting chords, in which the products of the segments of one chord are equal to the product of the segments of a second chord, the following relationship may be used by the processor arrangement 64 to determine an occupant's minimum seating and/or steering wheel position requirements, using the seat belt extraction information and predetermined information of the distance between two seat belt anchoring points (or other suitable reference points). FIG. 10A shows the path of a lap belt and a shoulder belt with respect to a vehicle seat. The following example assumes a vehicle seat architecture that would provide an average chord length of 25" between seat belt anchoring points XY and YZ, as shown in FIG. 10A. This chord length may vary based upon the particular seat architecture for a particular vehicle.

Figure 10B:
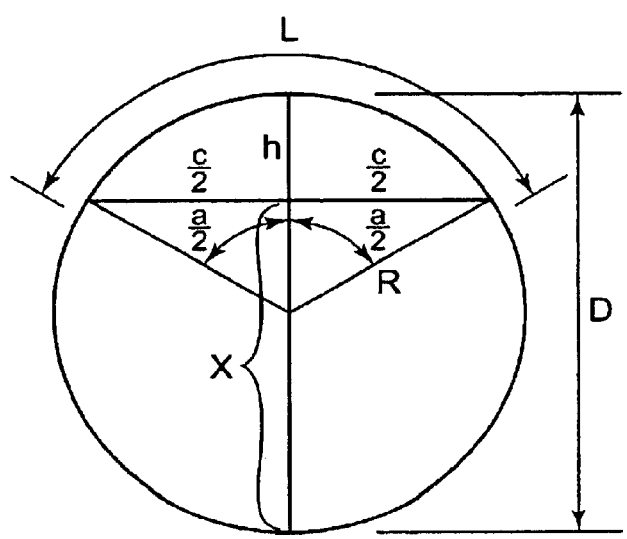
FIG. 10B shows an extended view of a path of a lap or shoulder belt for use in determining a protrusion amount or a depth of a person seated in the vehicle seat.

In an example vehicle seating arrangement, the design distances are as follows: XY=31" and YZ=19", so that 50"=total chord length and 25"=average chord length. FIG. 10B shows an extended view of a path of a lap or shoulder belt for use in determining a protrusion amount or a depth of a person seated in the vehicle seat. In particular, as shown in FIG. 10A, the extracted seat belt forms two arcs XY and YZ, which are at a height of "h" from the seat-back chord lines XY and YZ. It is believed that the occupant's depression into a softer seat does not substantially effect this computation, since it is only concerned with the actual protrusion of the occupant's chest relative to the position of the driver air-bag or passenger air-bag.

When chords intersect within a circle, the product of the segments of the first chord is equal to the product of the segments of the second chord. Therefore, in FIG. 10B, $c/2 * c/2 = h * x$, and $c^2/4 = h*x$. If, as stated above, the average chord length c is 25", then the solution for a 7" chest protrusion is as follows: 625/4=7 x, so that 156.25=7 x, and x=22.32 (value x). Also, the diameter D=x+7=29.32 (value h+x), and the radius R=½ diameter=14.66 (value R), so that the circumference=29.32*3.1416=92.11 (value Circ). Since the angle $a/2 = c/(R*2) = 12.5/14.66 = 0.8526603 = 58.50$ degrees, angle a=58.50*2=117 degrees (value a). Where the length of the arc is directly proportional to the subtended angle, the arc length (or seat belt length) may be determined as follows: 360/92.11=117/L, so that L=29.94 (value L). As two arcs are involved, each of length 29.94", the length of seat belt used in excess of the two average 25" chords of the example is as follows: 2(L−c)=2(29.94−25)=9.88" (value Extract). This represents the additional belt extracted as compared to a belted empty seat, which is available distance information for any particular vehicle.

An exemplary Table A (where the depths or protrusions h may be, for example, about 7" to 12" (where the average chord is 25" for a particular vehicle seat arrangement), is as follows:

TABLE A

| "h" | "x" | "h + x" | "R" | "Circ" | "a/2" | "A" | "L" | "Extract" |
|---|---|---|---|---|---|---|---|---|
| 7" | 22.32 | 29.32 | 14.66 | 92.11 | 58.50 | 117 | 29.94 | 9.88" |
| 8" | 19.53 | 27.53 | 13.77 | 86.49 | 65.2 | 130.4 | 31.33 | 12.66" |
| 9" | 17.36 | 26.36 | 13.18 | 82.81 | 71.5 | 143 | 32.89 | 15.78" |
| 10" | 15.63 | 25.63 | 12.82 | 80.52 | 77.17 | 154.34 | 34.52 | 19.04" |
| 11" | 14.20 | 25.20 | 12.60 | 79.17 | 82.78 | 165.55 | 36.41 | 22.82" |
| 12" | 13.02 | 25.02 | 12.51 | 78.60 | 87.71 | 175.42 | 38.30 | 26.60" |

The computations may be expressed for any average chord c of the arcs XY and YZ, where c=average seat chord length, h=occupant (chest) protrusion from a predetermined seat-back line, and L=average arc length, as follows: $c^2/4/h+h=D$, where D/2=r, so that 3.1416*D=circumference, and $c/(R*2) = \sin \frac{1}{2}$ angle a, so that 360/3.1416*D=angle a (degrees)/L, so that L may be used to determine the extracted seat belt length ESBL, where ESBL=2(L−c)=extracted belt length in excess of chords XY and YZ (that is, the seat belt length required for an unoccupied seat).

Thus, an occupant's protrusion from a predetermined seat-back line may be determined based on the extracted seat belt length ESBL. Accordingly, the processor arrangement 64 may be used to determine an effective maximum forward seat position/slide (and/or vehicle steering wheel position of a telescoping and/or tilting steering wheel) to maintain a 10" safe distance clearance may be determined as described herein. For example, if the extracted seat belt length ESBL is determined to be 13.50" (indicating a 9" protrusion in Table A), the effective position of the vehicle seat (and/or the steering wheel for a driver) should be set to maintain a minimum distance of about 19" from a predetermined reference line of the seat-back to the air-bag (that is, 19" is the 9" protrusion and the minimum air-bag to occupant distance of 10"). A manufacturer may establish such tables in any increment, adjusted for predetermined vehicle safety belt anchor distances (or other suitable reference points) at varying seat slide positions and unoccupied seat belt length.

As shown in FIG. 10B, there is a mathematical relationship between seat belt extraction and the determination of an occupant's position relative to a known location of the steering wheel and the seat back location based upon each vehicle's design. Because of this and because of the relatively small variance in human chest depth, a ratio geared mechanical cable connection from the seat belt extractor and a forward seat slide limit may be incorporated in different vehicles, even those having manual seat slides.

Upon fastening the seat belt, the seat slide limit would preclude further seat forward motion in which case the driver would manually retract the pedal slide using lever 12, as shown in FIG. 1A, to a comfortable driving position. Should the seat be closer than the seat limit allowed, a simple visual indicator may be used to inform the driver that the seat must be retracted to maintain a safe clearance. Since this would not require computer controls, electric seats or distance sensors, it may be incorporated in all vehicles, at the relatively minor cost of a cable connection from a belt extractor to a seat slide limit, and the manually adjustable pedal slide as shown in FIG. 2A.

The entire disclosure of the priority applications is hereby incorporated by reference, as necessary.

The examples of distances such as the minimum clearance from an air-bag are discussed throughout this specification, but these distances may vary on a case-by-case basis. In addition, the above-described embodiments are only exemplary and there are variations and modifications of the disclosed exemplary embodiments and/or exemplary method. These variations and modifications are considered to be within the scope of the claimed inventions.

What is claimed is:

1. A vehicle air-bag minimum safe clearance distance apparatus for use with a first air-bag and a first seat mounted within a passenger compartment of a vehicle, the apparatus comprising:

a first seat position adjusting mechanism movably connecting the first seat with respect to the vehicle, and to allowing the first seat to move relative to the first air-bag along a first axis between a forward-most position and a rearward-most position; and an occupant protrusion determining arrangement to determine an occupant protrusion;

wherein:

the forward-most position is a position of the first seat in which a distance between a passenger seated in the first seat and the first air-bag is equal to a minimum safe clearance distance, displacement of the first seat away from the forward-most position increasing the distance between the first seat and the first air-bag, and the first air-bag is fixedly positioned with respect to one of a steering wheel assembly for a driver and a dashboard arrangement for a passenger other than the driver.

2. The apparatus of claim 1, wherein the minimum clearance distance is the distance between the first air-bag and a seat-back of the first seat less the determined protrusion of an occupant.

3. The apparatus of claim 2, wherein the predetermined protrusion of the occupant is a fixed distance.

4. The apparatus of claim 1, wherein the occupant protrusion determining arrangement is operable to determine the occupant protrusion based on an extracted seat belt length.

5. The apparatus of claim 1, wherein the seat position adjusting mechanism includes a lever which, in a first position, prevents the first seat from moving forward and rearward and which, in a second position, releases the first seat so that the first seat may be moved forward and rearward by a passenger seated in the first seat.

6. A vehicle air-bag minimum safe clearance distance apparatus for use with a first air-bag and a first seat mounted within a passenger compartment of a vehicle, the apparatus comprising:

means for providing first seat position adjustment by movably connecting the first seat with respect to the vehicle, and allowing the first seat to move relative to the first air-bag along a first axis between a forward-most position and a rearward-most position; and means for determining an occupant protrusion;

wherein:

the forward-most position is a position of the first seat in which a distance between a passenger seated in the first seat and the first air-bag is equal to a minimum safe clearance distance, displacement of the first seat away from the forward-most position increasing the distance between the first seat and the first air-bag, and the first air-bag is fixedly positioned with respect to one of a steering wheel assembly for a driver and a dashboard arrangement for a passenger other than the driver.

7. The apparatus of claim 6, wherein the minimum clearance distance is the distance between the first air-bag and a seat-back of the first seat less the determined protrusion of an occupant.

8. The apparatus of claim 7, wherein the determined protrusion of the occupant is a fixed distance.

9. The apparatus of claim 6, wherein the means for determining the occupant protrusion is operable to determine the occupant protrusion based on an extracted seat belt length.

10. The apparatus of claims 1 and 6, wherein the first seat is a driver's seat and wherein the vehicle includes at least one vehicle control pedal positioned in the passenger compartment forward of the first seat, the apparatus further comprising a pedal position adjusting mechanism for moving the at least one pedal toward and away from the first seat.

11. The apparatus of claim 10, wherein the pedal position adjusting mechanism includes a pedal mounting member to which the at least one pedal is rotatably mounted, the pedal mounting member being slidably mounted within the passenger compartment so that the at least one pedal may be slid along a pedal adjusting axis substantially parallel to the first axis between a forward-most position and a rearward-most position.

12. The apparatus of claim 10, wherein, when in the forward-most position, a seat-back of the first se,at is separated from the first air-bag by a distance equal to the minimum safe clearance distance plus a value corresponding to an adult chest depth.

13. The apparatus of claim 10, wherein the apparatus is for use with a position defining arrangement for defining the forward-most position based on a distance between a passenger seated in the first seat and the first air-bag, the apparatus further comprising a distance sensor for determining the distance and for providing the distance to the position defining arrangement.

14. The apparatus of claim 10, wherein a second seat is mounted within the passenger compartment, the second seat being movably connected to the vehicle by a second seat position adjusting mechanism, the second seat position adjusting mechanism allowing the second seat to move along a second axis parallel to the first axis between a forward-most position and a rearward-most position, and a second air-bag is mounted within the passenger compartment in front of the forward-most position of the second seat, the forward-most position of the second seat being defined as a position of the second seat in which a distance between a passenger seated in the second seat and the second air-bag is equal to a minimum safe clearance.

15. The apparatus of claim 10, wherein a plurality of pedals are coupled to the pedal position adjusting mechanism so that, when the position of the pedals is adjusted a predetermined positioning of the pedals relative to one another is maintained.

16. The apparatus of claim 15, further comprising a cable extending from a first end coupled to an actuator of a vehicle control device, around first and second pulley assemblies to a second end thereof, the second end of the cable being coupled to an anchor member, the first pulley assembly including a first pulley rotatably and movably coupled to the pedal mount and the second pulley assembly including a second pulley rotatably and non-movably coupled to the pedal mount.

17. The apparatus of claim 10, wherein the first air-bag is mounted in the steering wheel assembly of the vehicle.

18. The apparatus of claims 1 and 6, wherein the first seat is a driver's seat and the first air-bag is mounted in the steering wheel assembly of the vehicle and wherein the vehicle includes at least one vehicle control pedal movably coupled to a pedal mount, the pedal mount being movably mounted to the vehicle so that the at least one pedal may be moved toward and away from the first seat.

19. The apparatus of claims 1 and 6, further comprising a height sensor for sensing a position of a portion of a passenger seated in the first seat corresponding to a height of the eyes of the passenger.

20. The apparatus of claims 1 and 6, further comprising a distance sensor sensing a position of a passenger seated in the first seat corresponding to a distance between the passenger and the first air-bag.

21. The apparatus of claims 1 and 6, further comprising a seat position switch so that actuation of the seat position switch causes a corresponding motion of the first seat using a control unit.

22. The apparatus of claim 21, further comprising:
a distance sensor which detects a distance between a passenger seated in the first seat and the first air-bag, the distance sensor being coupled to a computer, wherein the control unit includes the computer, and wherein the computer determines the location of the forward-most position of the first seat so that, when the first seat is in the forward-most position, a distance between a passenger seated in the first seat and the first air-bag is equal to the minimum safe clearance distance.

23. The apparatus of claim 22, further comprising a pedal mount to which at least one vehicle control pedal is mounted, wherein, when the first seat is in the forward-most position, upon actuation of the seat position switch to request forward motion of the first seat, the pedal mount is movable toward the first seat.

24. The apparatus of claim 23, further comprising a memory in which preferred first seat and pedal mount positions are stored.

25. The apparatus of claim 23, further comprising an override switch which allows a passenger to select a personal forward-most position so that, when the first seat is in the personal forward-most position, actuation of the seat position switch to request further forward motion of the first seat initiates rearward motion of the at least one vehicle control pedal.

26. The apparatus of claim 22, wherein the first seat is movable vertically.

27. The apparatus of claim 26, further comprising a height sensor for sensing a height of eyes of a passenger in the first seat, wherein the height sensor is coupled to, the computer for use in moving the first seat vertically until an optimum eye height is achieved.

28. The apparatus of claim 22, wherein, when the distance sensor indicates that a passenger seated in the first seat has encroached within the minimum safe clearance distance, the computer controls operation of the first air-bag in a reduced clearance mode.

29. The apparatus of claim 28, wherein in the reduced clearance mode, the computer prohibits deployment of the first air-bag.

30. The apparatus of claim 28, wherein in the reduced clearance mode, the computer reduces an inflation pressure of the first air-bag.

31. The apparatus of claim 28, wherein in the reduced clearance mode, the computer directs staged inflation of the air-bag.

32. The apparatus of claims 1 and 6, further comprising a pedal switch, operation of the pedal switch causing a corresponding motion of a pedal mount.

33. The apparatus of claims 1 and 6, further comprising:
a height sensor for sensing a height of eyes of a passenger in the first seat; and
a seat position controller for use in moving the first seat vertically until an optimum eye height is achieved.

34. The apparatus of claims 1 and 6, further comprising:
a distance sensor to sense a position of a passenger seated in the first seat corresponding to a distance between the passenger and the first air-bag, and to provide data to a control unit for use in horizontally moving the first seat along the first axis until the distance sensor indicates that the first seat is in the forward-most position.

35. The apparatus of claims 1 and 6, further comprising:
a pedal position adjusting mechanism for moving at least one pedal toward and away from the first seat, the first seat being a driver seat;
a distance sensor for determining an actual distance and for providing it to a control unit for defining the forward-most position based on a distance between a passenger seated in the first seat and the first air-bag; and
a passenger notification device coupled to the control unit for notifying the passenger, when the passenger moves forward within the minimum safe clearance distance, that the minimum safe clearance distance has been encroached upon.

36. The apparatus of claims 1 and 6, further comprising:
a pedal adjusting arrangement to move a plurality of pedals between a first position and a second position, the at least one pedal being positioned in the passenger compartment forward of the first seat, and when one of the plurality of pedals is moved, the plurality of pedals moves together, so as to maintain a predetermined positioning of each of the plurality of pedals relative to one another.

37. The apparatus of claim 36, wherein the first position and the second position are separated by a distance of about six inches.

38. The apparatus of claim 36, wherein the front-seat arrangement and the pedal adjusting arrangement are operated so that the passenger may operate the plurality of pedals while seated at the minimum safe clearance distance.

39. The apparatus of claim 36, wherein the pedal adjusting arrangement includes a positioning arrangement that is movable to move the plurality of pedals between the first position and the second position, and the pedal adjusting arrangement is operable to move the plurality of pedals linearly between the first position and the second position.

40. The apparatus of claim 39, wherein the first position and the second position are separated by a distance of about six inches.

41. The apparatus of claims 36, wherein the minimum safe clearance distance provides a distance of about 10 inches between a portion of a chest of the passenger and the air-bag.

42. The apparatus of claim 41, wherein the first seat and the pedal adjusting arrangement are operated so that the passenger may operate the plurality of pedals while seated at the minimum safe clearance distance.

43. The apparatus of claims 1 and 6, further comprising:
a distance determining arrangement that includes a distance sensor to obtain a measure of the distance between the passenger and the first air-bag.

44. The apparatus of claims 1 and 6, further comprising:
a passenger position determining arrangement to determine a position corresponding to an eye-level height of the passenger.

45. The apparatus of claim 44, wherein the air-bag is mounted in a steering wheel of the vehicle.

46. The apparatus of claims 1 and 6, wherein the occupant protrusion is determined using computations expressed for an average chord c of arcs XY and YZ, where c=an average seat chord length, h=the occupant (chest) protrusion from a predetermined seat-back line, and L=an average arc, length, where: $c^2/4/h+h=D$, where $D/2=r$, so that $3.1416*D=$ circumference, and $c/(R*2)=\sin \frac{1}{2}$ angle a, so that $360/3.1416*D=$angle a (degrees)/L, so that L is used to determine an extracted seat belt length ESBL, where ESBL=2 (L−c)=extracted belt length in excess of chords XY and YZ, which represent shoulder and lap seat belt lengths for an unoccupied seat.

47. A method of maintaining a minimum safe clearance between an air-bag mounted in a vehicle and a vehicle passenger to be protected by the air-bag, wherein the vehicle includes a seat which may be moved toward and away from the air-bag, the method comprising:
limiting motion of the seat toward the air bag to prevent motion of the seat beyond a forward-most position wherein, when in the forward-most position, a passenger seated in the seat is separated from the air-bag by a predetermined minimum safe clearance;
adjusting a position of at least one vehicle control pedal to achieve a desired distance between the seat and the at least one pedal; and
determining an occupant protrusion based on an extracted seat belt length;
wherein the air-bag is fixedly positioned with respect to one of a steering wheel assembly for a driver and a dashboard arrangement for a passenger other than the driver.

48. The method of claim 47, further comprising:
wherein the vehicle includes a computer and a sensor for detecting a distance between a passenger seated in the seat and the air-bag, the step of limiting motion of the seat being performed to prohibit further forward directed movement of the seat when the sensor indicates that the distance between a passenger seated in the seat and the air-bag is equal to the minimum safe clearance.

49. The method of claim 47, wherein the vehicle further includes a pedal moving arrangement for moving the at least one pedal toward and away from the seat, the method further comprising:
operating the pedal moving arrangement to move the at least one pedal rearward toward the seat while the seat is in the forward-most position.

50. The method of claim 47, further comprising:
preventing the air-bag from deploying when the sensor indicates that a passenger seated in the seat has encroached within the minimum safe clearance.

51. The method of claim 47, further comprising:
reducing an inflation rate of the air-bag when the sensor indicates that a passenger seated in the seat has encroached within the minimum safe clearance.

52. The method of claim 47, further comprising:
inflating the air-bag in stages when the sensor indicates that a passenger seated in the seat has encroached within the minimum safe clearance.

53. The method of claim 47, further comprising:
moving the at least one pedal between a first position and a second position using a pedal adjusting arrangement, the at least one pedal being positioned in a passenger compartment forward of the seat.

54. The method of claim 53, wherein the at least one pedal includes a plurality of pedals, and when one of the plurality of pedals is moved, the plurality of pedals moves together, so as to maintain a predetermined positioning of each of the plurality of pedals relative to one another.

55. The method of claim 53, wherein the first position and the second position are separated by a distance of about six inches.

56. The method of claim 53, wherein the seat and the pedal adjusting arrangement are operated so that the passenger may operate the at least one pedal while seated at the minimum safe clearance.

57. The method of claim 53, wherein the pedal adjusting arrangement includes a positioning arrangement that is movable to move the at least one pedal between the first position and the second position, wherein the pedal adjusting arrangement is operable to move the at least one pedal linearly between the first position and the second position.

58. The method of claim 47, wherein a distance sensor obtains a measure of the distance between the passenger and the air-bag.

59. The method of claim 47, further comprising: determining a position corresponding to an eye-level height of the passenger.

* * * * *

UNITED STATES PATENT AND TRADEMARK OFFICE
CERTIFICATE OF CORRECTION

PATENT NO.    : 6,820,895 B2
DATED         : November 23, 2004
INVENTOR(S)   : Levine It is certified that error appears in the above-identified patent and that said Letters Patent is hereby corrected as shown below:

Title page,
Item [75], Inventor, change "Richard Levine," to -- Richard W. Levine, --;

Column 3,
Line 7, change "; eye" to -- eye --;

Column 6,
Line 33, change "!third" to -- third --;

Column 17,
Line 61, change "clearence" to -- clearance --;

Column 18,
Line 41, change "se,at" to -- seat --.

Signed and Sealed this

Twenty-first Day of June, 2005

JON W. DUDAS
*Director of the United States Patent and Trademark Office*